United States Patent
Peredriy et al.

(10) Patent No.: US 9,990,592 B2
(45) Date of Patent: Jun. 5, 2018

(54) KERNEL PARAMETER SELECTION IN SUPPORT VECTOR DATA DESCRIPTION FOR OUTLIER IDENTIFICATION

(71) Applicant: SAS Institute Inc., Cary, NC (US)

(72) Inventors: Sergiy Peredriy, Auburndale, MA (US); Deovrat Vijay Kakde, Cary, NC (US); Arin Chaudhuri, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 0 days. days.

(21) Appl. No.: 15/583,067

(22) Filed: May 1, 2017

(65) Prior Publication Data

US 2017/0236074 A1    Aug. 17, 2017

Related U.S. Application Data

(63) Continuation-in-part of application No. 15/390,236, filed on Dec. 23, 2016, now Pat. No. 9,639,809, which is a continuation-in-part of application No. 15/185,277, filed on Jun. 17, 2016, and a continuation-in-part of application No. 15/096,552, filed on Apr. 12, 2016, now Pat. No. 9,536,208, application No. 15/583,067, filed on May 1, 2017,
(Continued)

(51) Int. Cl.
*G06N 99/00* (2010.01)
*G06F 17/30* (2006.01)

(52) U.S. Cl.
CPC ..... *G06N 99/005* (2013.01); *G06F 17/30958* (2013.01)

(58) Field of Classification Search
CPC ............ G06F 17/30958; G06K 9/6269; G06K 9/6284
See application file for complete search history.

(56) References Cited

U.S. PATENT DOCUMENTS

| 8,527,435 | B1 | 9/2013 | Han et al. |
| 9,536,208 | B1 | 1/2017 | Kakde et al. |

(Continued)

OTHER PUBLICATIONS

Tax, D.M. and Duin, R.P., 2004. Support vector data description. Machine learning, 54(1), pp. 45-66.*
(Continued)

*Primary Examiner* — Stanley K. Hill
(74) *Attorney, Agent, or Firm* — Bell & Manning, LLC

(57) ABSTRACT

A computing device determines a kernel parameter value for a support vector data description for outlier identification. A first candidate optimal kernel parameter value is computed by computing a first optimal value of a first objective function that includes a kernel function for each of a plurality of kernel parameter values from a starting kernel parameter value to an ending kernel parameter value using an incremental kernel parameter value. The first objective function is defined for a SVDD model using observation vectors to define support vectors. A number of the observation vectors is a predefined sample size. The predefined sample size is incremented by adding a sample size increment. A next candidate optimal kernel parameter value is computed with an incremented number of vectors until a computed difference value is less than or equal to a predefined convergence value.

30 Claims, 15 Drawing Sheets

Related U.S. Application Data which is a continuation-in-part of application No. 15/185,277, filed on Jun. 17, 2016.

(60) Provisional application No. 62/454,825, filed on Feb. 5, 2017, provisional application No. 62/381,624, filed on Aug. 31, 2016, provisional application No. 62/331,084, filed on May 3, 2016, provisional application No. 62/293,494, filed on Feb. 10, 2016.

(56) References Cited

U.S. PATENT DOCUMENTS

| | | | | |
|---|---|---|---|---|
| 2008/0301070 | A1* | 12/2008 | Bartlett | G06K 9/6215 706/12 |
| 2014/0046878 | A1* | 2/2014 | Lecomte | G10L 25/51 706/12 |
| 2015/0356455 | A1* | 12/2015 | Wu | G06K 9/00979 706/12 |

OTHER PUBLICATIONS

Zhao, Y., Wang, S. and Xiao, F., 2013. Pattern recognition-based chillers fault detection method using Support Vector Data Description (SVDD).Applied Energy, 112, pp. 1041-1048.*

Deng et al., Model Selection for Anomaly Detection in Wireless Ad Hoc Networks, Proceedings of the 2007 IEEE Symposium on Computational Intelligence and Data Mining, Mar. 1, 2007, pp. 540-546.

Peredriy et al., Kernel Bandwidth Selection for SVDD: The Sampling Peak Criterion Method for Large Data, Oct. 31, 2016.

Chaudhuri et al., Sampling Method for Fast Training of Support Vector Data Description, arXiv:1606.05382v3 Sep. 25, 2016.

Grandvalet et al., Adaptive Scaling for Feature Selection in SVMs, Jan. 2002.

Chapelle et al., Choosing Multiple Parameters for Support Vector Machines, Machine Learning, 46, 2002, pp. 131-159.

Cristianini et al., Dynamically Adapting Kernels in Support Vector Machines, Advances in Neural Information Processing Systems 11, Jan. 1998.

Sheather et al., A Reliable Data-Based Bandwidth Selection Method for Kernel Density Estimation, Journal of the Royal Statistical Society. Series B (Methodological), vol. 53, Issue 3, 1991, pp. 683-690.

Kakde et al., Peak Criterion for Choosing Gaussian Kernel Bandwidth in Support Vector Data Description, arXiv:1602.05257v1, Feb. 17, 2016.

Evangelista et al., Some Properties of the Gaussian Kernel for One Class Learning, Proc. Intern. Conference on Artificial Neural Networks, ICANN07 Porto, Portugal, Sep. 2007, Lecture Notes in Computer Science, vol. 4668, Part I, Springer Berlin, Germany, 2007, pp. 269-278.

Tax et al., Support Vector Data Description, Machine Learning, 54, 2004, pp. 45-66.

Xiao et al., Two methods of selecting Gaussian kernel parameters for one-class SVM and their application to fault detection, Knowledge-Based Systems, vol. 59, Jan. 27, 2014, pp. 75-84.

* cited by examiner

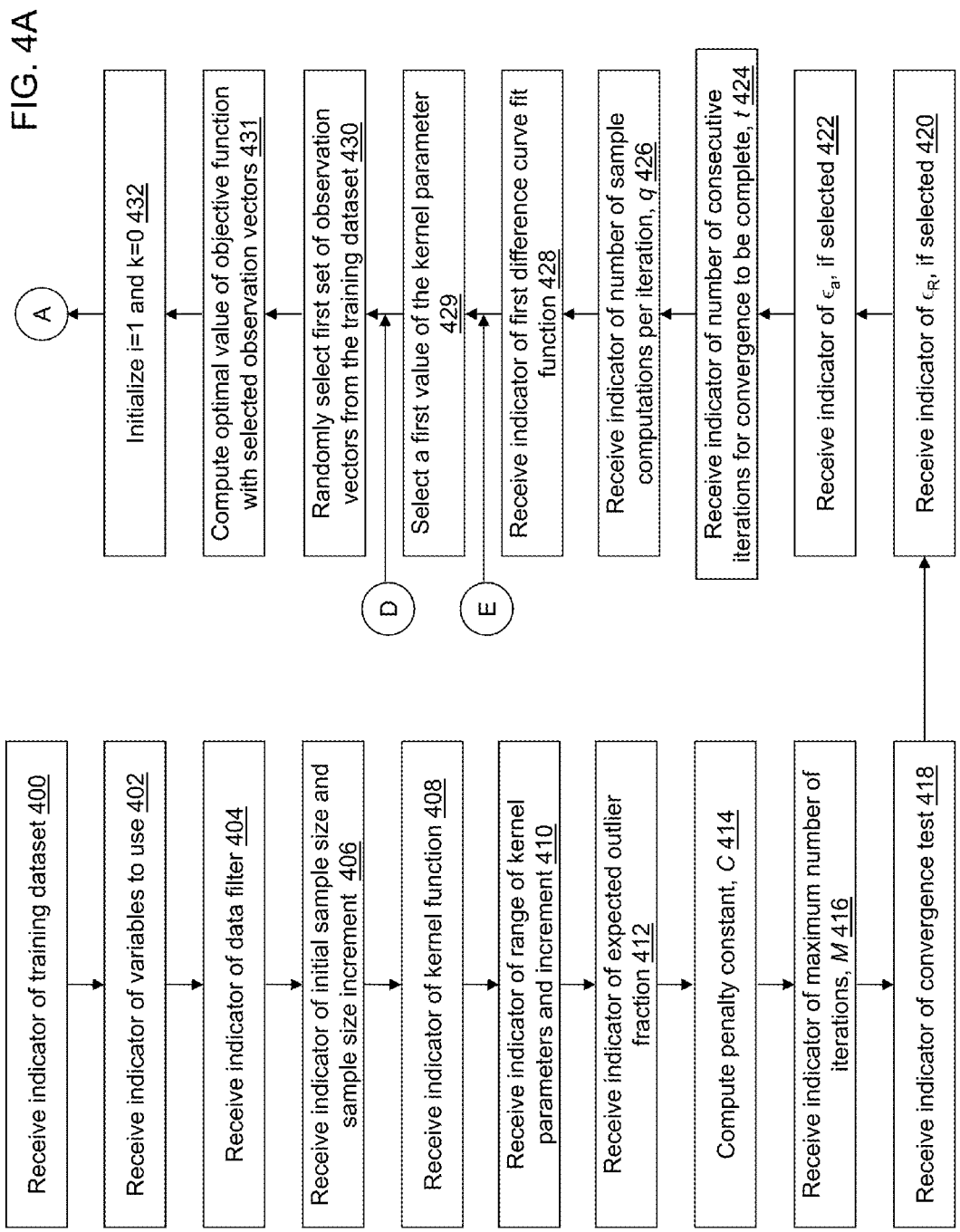

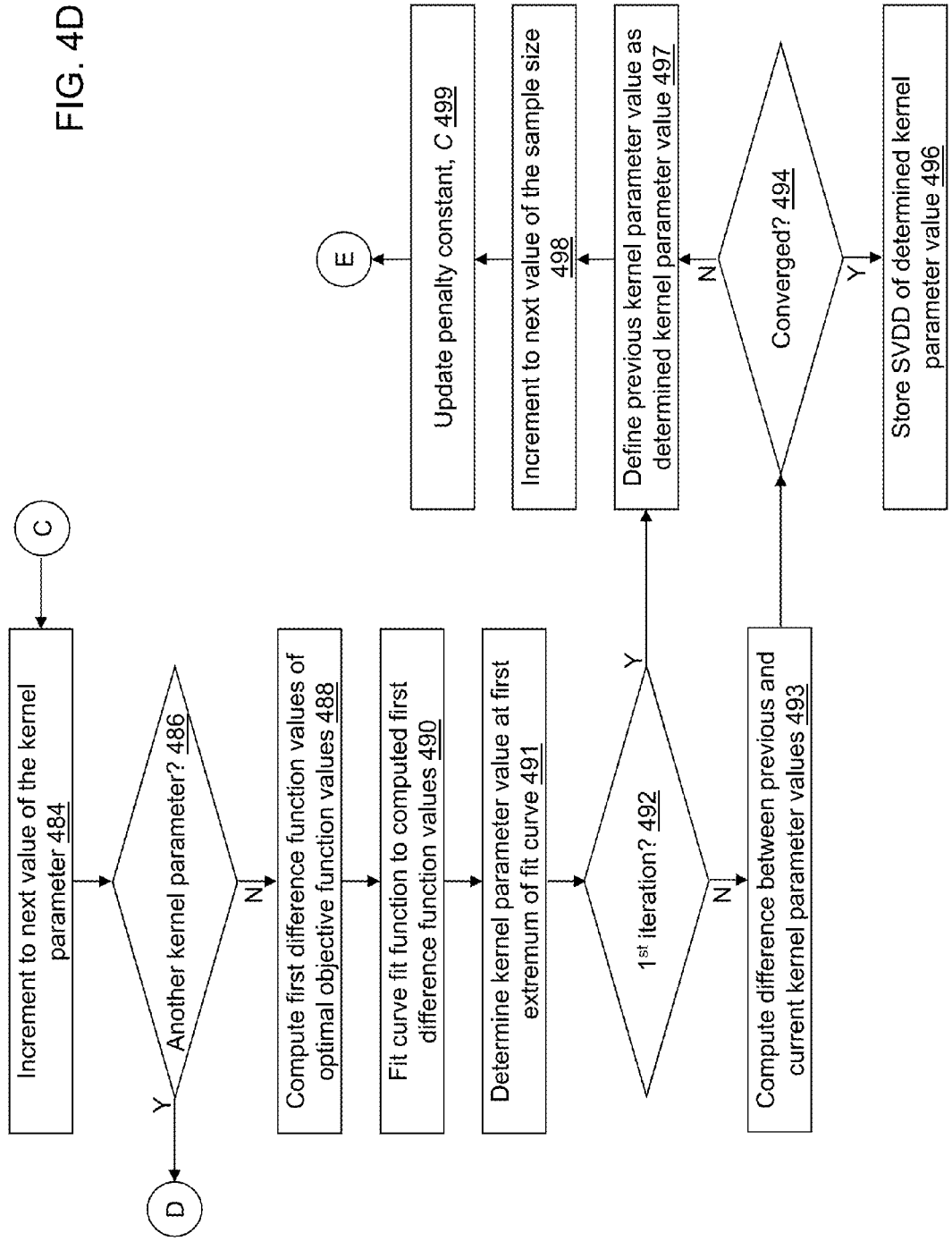

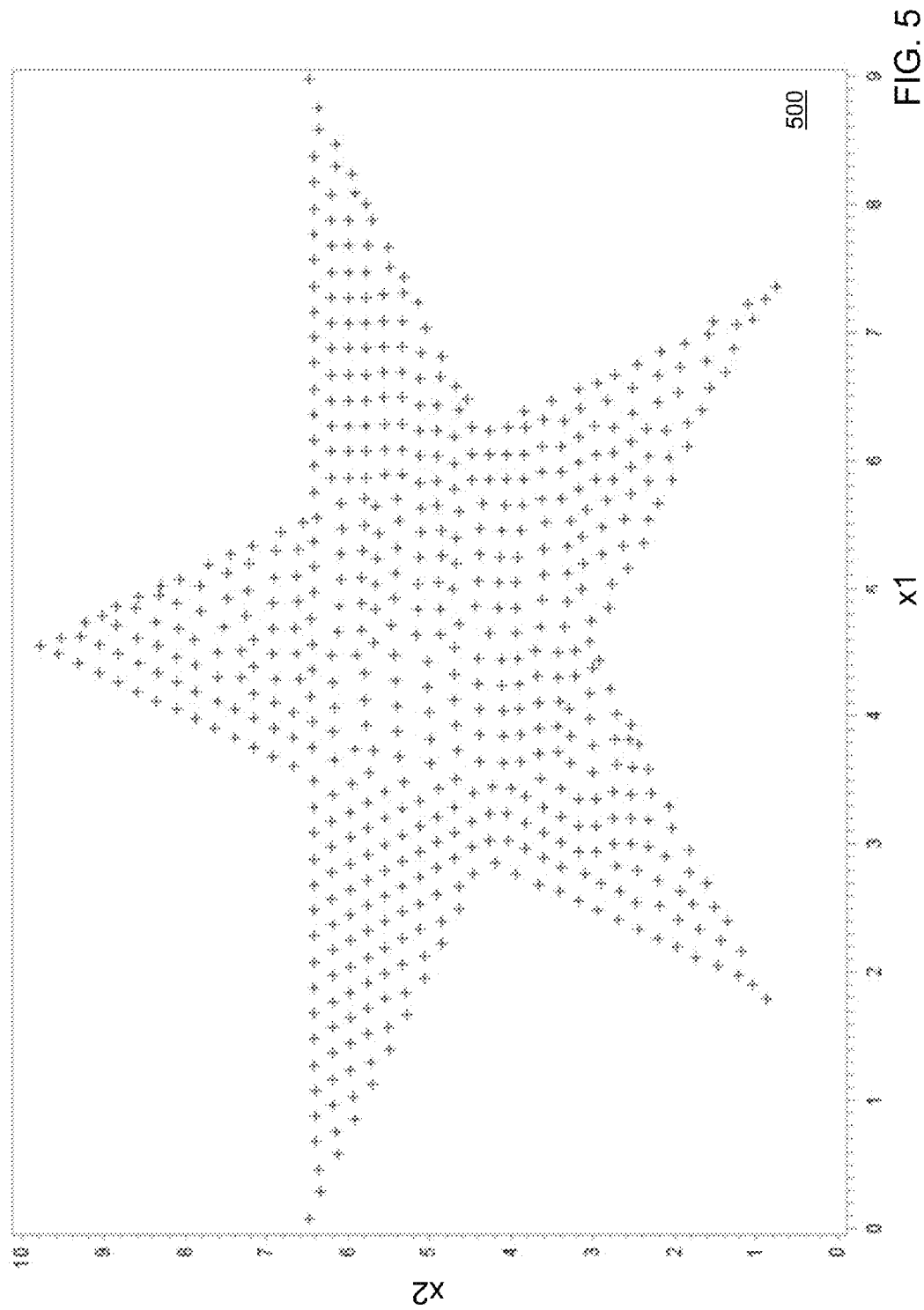

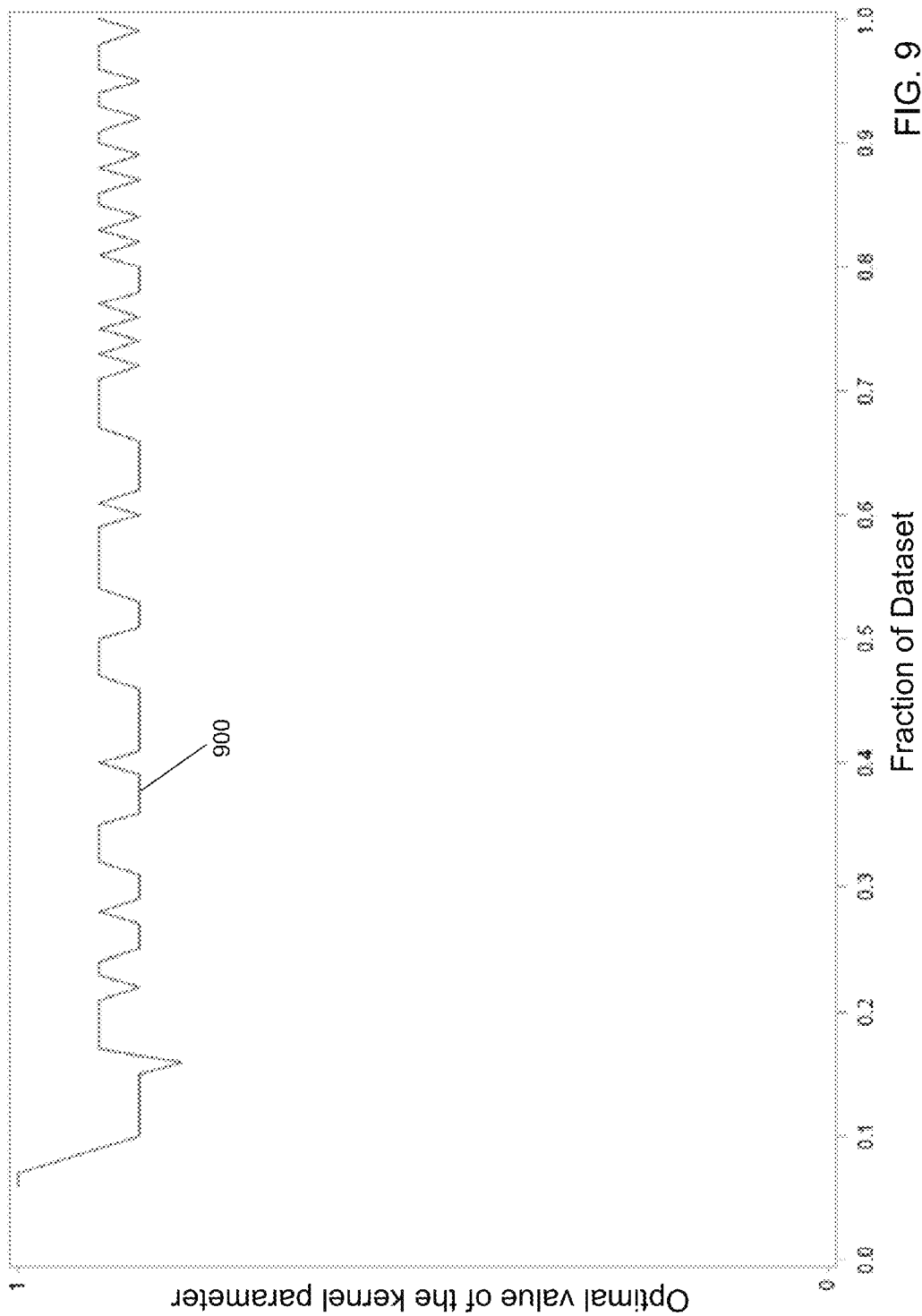

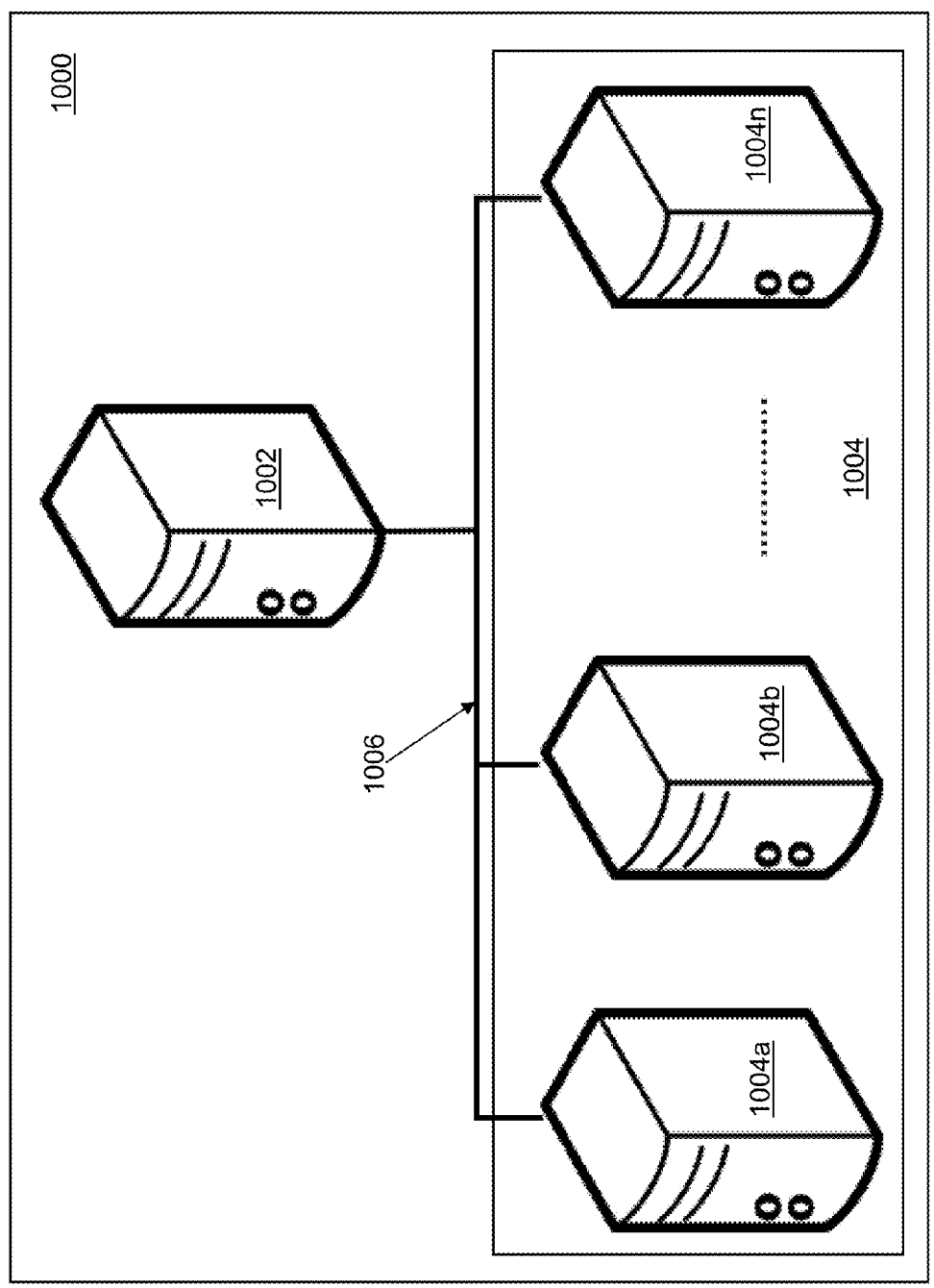

KERNEL PARAMETER SELECTION IN SUPPORT VECTOR DATA DESCRIPTION FOR OUTLIER IDENTIFICATION

CROSS-REFERENCE TO RELATED APPLICATIONS

The present application claims the benefit of 35 U.S.C. § 119(e) to U.S. Provisional Patent Application No. 62/454,825 filed on Feb. 5, 2017, the entire contents of which are hereby incorporated by reference. The present application also claims the benefit of 35 U.S.C. § 119(e) to U.S. Provisional Patent Application No. 62/381,624 filed on Aug. 31, 2016, the entire contents of which are hereby incorporated by reference. The present application also claims the benefit of 35 U.S.C. § 119(e) to U.S. Provisional Patent Application No. 62/331,084 filed on May 3, 2016, the entire contents of which are hereby incorporated by reference.

The present application is also a continuation-in-part of U.S. patent application Ser. No. 15/390,236 that was filed Dec. 23, 2016, and issued as U.S. Pat. No. 9,639,809 on May 2, 2017, the entire contents of which are hereby incorporated by reference. U.S. patent application Ser. No. 15/390,236 is a continuation-in-part of U.S. patent application Ser. No. 15/096,552 that was filed Apr. 12, 2016, now issued as U.S. Pat. No. 9,536,208 on Jan. 3, 2017, the entire contents of which are hereby incorporated by reference. U.S. patent application Ser. No. 15/096,552 claimed the benefit of 35 U.S.C. § 119(e) to U.S. Provisional Patent Application No. 62/293,494 filed on Feb. 10, 2016, the entire contents of which are hereby incorporated by reference.

The present application is also a continuation-in-part of U.S. patent application Ser. No. 15/185,277 that was filed Jun. 17, 2016, the entire contents of which are hereby incorporated by reference.

BACKGROUND

Support vector data description (SVDD) is a machine-learning technique used for single class classification and outlier detection. SVDD formulation with a kernel function provides a flexible data description around data. The value of kernel function parameters affects the nature of the data boundary.

The SVDD of a dataset is obtained by solving a quadratic programming problem. The time required to solve the quadratic programming problem is directly related to the number of observations in the training dataset resulting in a very high computing time for large training datasets.

SUMMARY

In an example embodiment, a non-transitory computer-readable medium is provided having stored thereon computer-readable instructions that, when executed by a computing device, cause the computing device to determine a kernel parameter value for a support vector data description for outlier identification. A first candidate optimal kernel parameter value is computed by computing a first optimal value of a first objective function that includes a kernel function for each of a plurality of kernel parameter values from a starting kernel parameter value to an ending kernel parameter value using an incremental kernel parameter value. The first objective function is defined for a support vector data description (SVDD) model using a first set of observation vectors to define a first set of support vectors. A number of the first set of observation vectors is a predefined sample size. The first set of support vectors define a first data description for a training dataset that includes the first set of observation vectors. (a) The predefined sample size is incremented by adding a predefined sample size increment to the predefined sample size. (b) A second candidate optimal kernel parameter value is computed by computing a second optimal value of a second objective function that includes the kernel function for each of the plurality of kernel parameter values. The second objective function is defined for the SVDD model using a second set of observation vectors to define a second set of support vectors. A number of the second set of observation vectors is the incremented, predefined sample size. The second set of support vectors define a second data description for the training dataset that includes the second set of observation vectors. (c) A difference value is computed between the computed second candidate optimal value and the computed first candidate optimal value. (a)-(c) are repeated with the computed first candidate optimal value as the computed second candidate optimal value until the computed difference value is less than or equal to a predefined convergence value. When the computed difference value is less than or equal to the predefined convergence value, the computed second candidate optimal kernel parameter value is output for identifying an outlier in a scoring dataset.

In another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to determine the kernel parameter value for the SVDD for outlier identification.

In yet another example embodiment, a method of determining the kernel parameter value for the SVDD for outlier identification is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIGS. 4A, 4B, 4C, and 4D depict a flow diagram illustrating examples of operations performed by the SVDD training device of FIG. 1 in accordance with an illustrative embodiment.

FIG. 5 depicts an example dataset having a star shape in accordance with an illustrative embodiment.

FIG. 9 depicts an optimal value of the kernel parameter using the first example dataset of FIG. 5 as a function of the sample size in accordance with an illustrative embodiment.

FIG. 10 depicts a block diagram of an SVDD training system in accordance with an illustrative embodiment.

DETAILED DESCRIPTION

Figure 1:
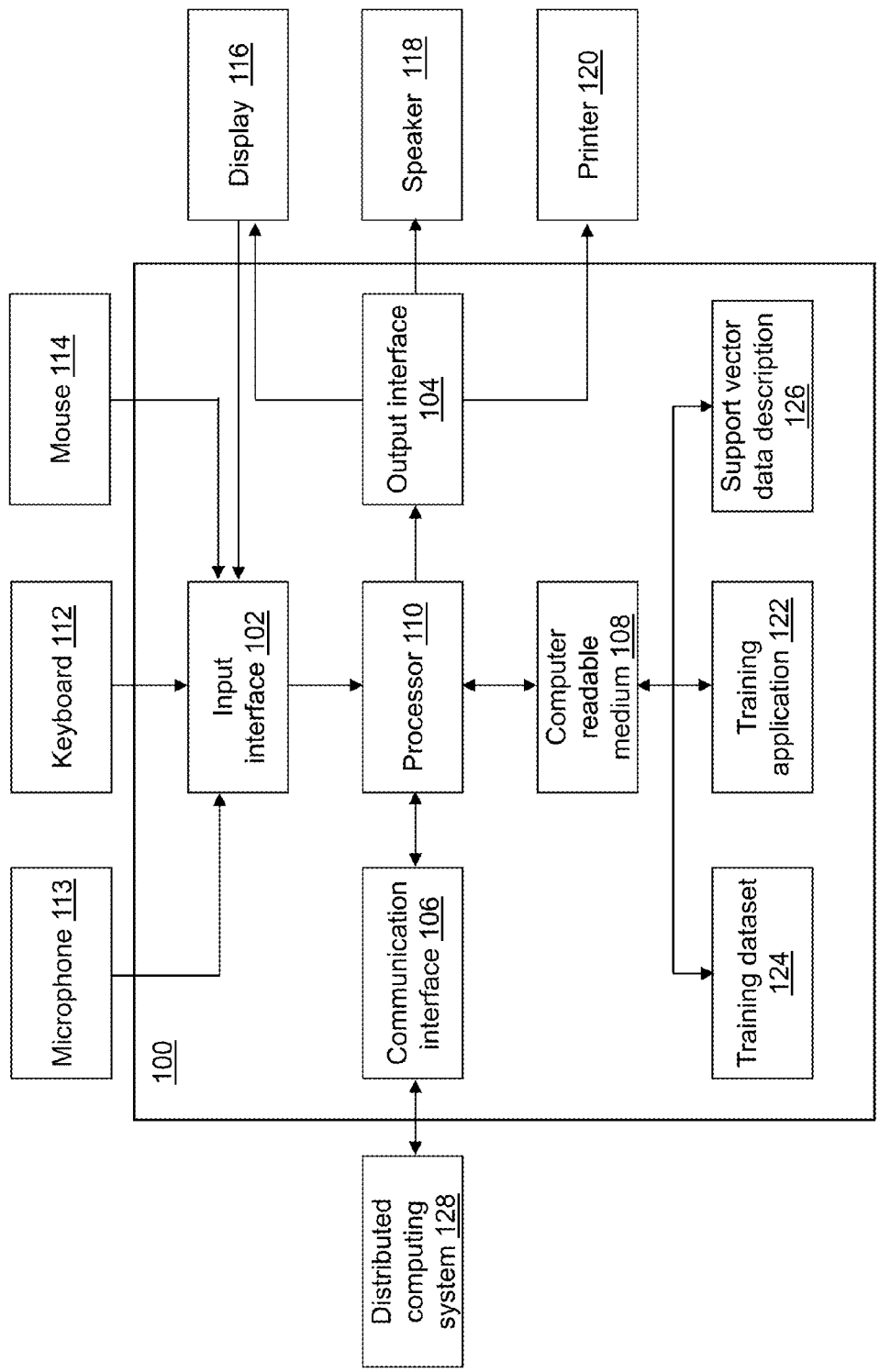
FIG. 1 depicts a block diagram of a support vector data description (SVDD) training device in accordance with an illustrative embodiment.

Referring to FIG. 1, a block diagram of a support vector data description (SVDD) training device 100 is shown in accordance with an illustrative embodiment. SVDD training device 100 may include an input interface 102, an output interface 104, a communication interface 106, a non-transitory computer-readable medium 108, a processor 110, a training application 122, a training dataset 124, and a support vector data description (SVDD) 126. Fewer, different, and/or additional components may be incorporated into SVDD training device 100.

Input interface 102 provides an interface for receiving information from the user or another device for entry into SVDD training device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into SVDD training device 100 or to make selections presented in a user interface displayed on display 116. The same interface may support both input interface 102 and output interface 104. For example, display 116 comprising a touch screen provides a mechanism for user input and for presentation of output to the user. SVDD training device 100 may have one or more input interfaces that use the same or a different input interface technology. The input interface technology further may be accessible by SVDD training device 100 through communication interface 106.

Output interface 104 provides an interface for outputting information for review by a user of SVDD training device 100 and/or for use by another application or device. For example, output interface 104 may interface with various output technologies including, but not limited to, display 116, a speaker 118, a printer 120, etc. SVDD training device 100 may have one or more output interfaces that use the same or a different output interface technology. The output interface technology further may be accessible by SVDD training device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. SVDD training device 100 may have one or more communication interfaces that use the same or a different communication interface technology. For example, SVDD training device 100 may support communication using an Ethernet port, a Bluetooth antenna, a telephone jack, a USB port, etc. Data and messages may be transferred between SVDD training device 100 and another computing device of a distributed computing system 128 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. SVDD training device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. SVDD training device 100 also may have one or more drives that support the loading of a memory media such as a CD, DVD, an external hard drive, etc. One or more external hard drives further may be connected to SVDD training device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. SVDD training device 100 may include a plurality of processors that use the same or a different processing technology.

Training application 122 performs operations associated with defining SVDD 126 from data stored in training dataset 124. SVDD 126 may be used to classify data stored in a dataset 1124 (shown referring to FIG. 11) and to monitor changes in data in dataset 1124 that may be stored in an outlier dataset 1126 (shown referring to FIG. 11) to support various data analysis functions as well as provide alert/messaging related to the monitored data. Some or all of the operations described herein may be embodied in training application 122. The operations may be implemented using hardware, firmware, software, or any combination of these methods.

Referring to the example embodiment of FIG. 1, training application 122 is implemented in software (comprised of computer-readable and/or computer-executable instructions)

stored in computer-readable medium 108 and accessible by processor 110 for execution of the instructions that embody the operations of training application 122. Training application 122 may be written using one or more programming languages, assembly languages, scripting languages, etc. Training application 122 may be integrated with other analytic tools. As an example, training application 122 may be part of an integrated data analytics software application and/or software architecture such as that offered by SAS Institute Inc. of Cary, N.C., USA. For example, training application 122 may be may be implemented using or integrated with one or more SAS software tools such as SAS® Enterprise Miner™, Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, all of which are developed and provided by SAS Institute Inc. of Cary, N.C., USA. Data mining is applicable in a wide variety of industries.

Training application 122 may be integrated with other system processing tools to automatically process data generated as part of operation of an enterprise, device, system, facility, etc., to identify any outliers in the processed data, to monitor changes in the data, and to provide a warning or alert associated with the monitored data using input interface 102, output interface 104, and/or communication interface 106 so that appropriate action can be initiated in response to changes in the monitored data.

Training application 122 may be implemented as a Web application. For example, training application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Training dataset 124 may include, for example, a plurality of rows and a plurality of columns. The plurality of rows may be referred to as observation vectors or records (observations), and the columns may be referred to as variables. Training dataset 124 may be transposed. Training dataset 124 may include unsupervised data. The plurality of variables may define multiple dimensions for each observation vector. An observation vector $x_i$ may include a value for each of the plurality of variables associated with the observation i. Each variable of the plurality of variables describes a characteristic of a physical object. For example, if training dataset 124 includes data related to operation of a vehicle, the variables may include an oil pressure, a speed, a gear indicator, a gas tank level, a tire pressure for each tire, an engine temperature, a radiator level, etc. Training dataset 124 may include data captured as a function of time for one or more physical objects.

The data stored in training dataset 124 may be generated by and/or captured from a variety of sources including one or more sensors of the same or different type, one or more computing devices, etc. The data stored in training dataset 124 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. As used herein, the data may include any type of content represented in any computer-readable format such as binary, alphanumeric, numeric, string, markup language, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observations (rows) and variables (columns) that can be processed by one or more SAS software tools.

Training dataset 124 may be stored on computer-readable medium 108 or on one or more computer-readable media of distributed computing system 128 and accessed by SVDD training device 100 using communication interface 106, input interface 102, and/or output interface 104. Data stored in training dataset 124 may be sensor measurements or signal values captured by a sensor, may be generated or captured in response to occurrence of an event or a transaction, generated by a device such as in response to an interaction by a user with the device, etc. The data stored in training dataset 124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in training dataset 124 may be captured at different time points periodically, intermittently, when an event occurs, etc. One or more columns of training dataset 124 may include a time and/or date value.

Training dataset 124 may include data captured under normal operating conditions of the physical object. Training dataset 124 may include data captured at a high data rate such as 200 or more observations per second for one or more physical objects. For example, data stored in training dataset 124 may be generated as part of the Internet of Things (IoT), where things (e.g., machines, devices, phones, sensors) can be connected to networks and the data from these things collected and processed within the things and/or external to the things before being stored in training dataset 124. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in training dataset 124.

Training dataset 124 may be stored using various data structures as known to those skilled in the art including one or more files of a file system, a relational database, one or more tables of a system of tables, a structured query language database, etc. on SVDD training device 100 or on distributed computing system 128. SVDD training device 100 may coordinate access to training dataset 124 that is distributed across distributed computing system 128 that may include one or more computing devices. For example, training dataset 124 may be stored in a cube distributed across a grid of computers as understood by a person of skill in the art. As another example, training dataset 124 may be stored in a multi-node Hadoop® cluster. For instance, Apache™ Hadoop® is an open-source software framework for distributed computing supported by the Apache Software Foundation. As another example, training dataset 124 may be stored in a cloud of computers and accessed using cloud computing technologies, as understood by a person of skill in the art. The SAS® LASR™ Analytic Server may be used as an analytic platform to enable multiple users to concurrently access data stored in training dataset 124. The SAS® Viya™ open, cloud-ready, in-memory architecture also may be used as an analytic platform to enable multiple users to concurrently access data stored in training dataset 124. Some systems may use SAS In-Memory Statistics for Hadoop® to read big data once and analyze it several times by persisting it in-memory for the entire session. Some systems may be of other types and configurations.

An SVDD model is used in domains where a majority of data in training dataset 124 belongs to a single class. An SVDD model for normal data description builds a minimum radius hypersphere around the data. The objective function for the SVDD model for normal data description is $$\max(\Sigma_{i=1}^{n} \alpha_i(x_i \cdot x_i) - \Sigma_{i=1}^{n} \Sigma_{j=1}^{n} \alpha_i \alpha_j (x_i \cdot x_1)), \quad (1)$$

subject to:

$$\Sigma_{i=1}^{n} \alpha_i = 1, \quad (2)$$

$$0 \leq \alpha_i \leq C, \forall i=1, \ldots, n, \quad (3)$$

where $x_i \in \mathbb{R}^m$, $i=1, \ldots, n$ represents n observations in training dataset 124, $\alpha_i \in \mathbb{R}$ are Lagrange constants, $C=1/nf$ is a penalty constant that controls a trade-off between a volume and errors, and f is an expected outlier fraction. The expected outlier fraction is generally known to an analyst. Data preprocessing can ensure that training dataset 124 belongs to a single class. In this case, f can be set to a very low value such as 0.001. SV is the set of support vectors that includes the observation vectors in training dataset 124 that have $C \geq \alpha_i > 0$ after solving equation (1) above. $SV_{<C}$ is a subset of the support vectors that includes the observation vectors in training dataset 124 that have $C > \alpha_i > 0$ after solving equation (1) above. The $SV_{<C}$ is a subset of the support vectors located on a boundary of the minimum radius hypersphere defined around the data.

Depending upon a position of an observation vector, the following results are true:

Center position: $\Sigma_{i=1}^{n} \alpha_i x_i = a$. (4)

Inside position: $\|x_i - a\| < R \rightarrow \alpha_i = 0$. (5)

Boundary position: $\|x_i - a\| = R \rightarrow 0 < \alpha_i < C$. (6)

Outside position: $\|x_i - a\| > R \rightarrow \alpha_i = C$. (7)

where a is a center of the hypersphere and R is a radius of the hypersphere. The radius of the hypersphere is calculated using:

$$R^2 = x_k \cdot x_k - 2\Sigma_{i=1}^{N_{SV}} \alpha_i(x_i \cdot x_k) + \Sigma_{i=1}^{N_{SV}} \Sigma_{j=1}^{N_{SV}} \alpha_i \alpha_j (x_i \cdot x_j) \quad (8)$$

where any $x_k \in SV_{<C}$, $x_i$ and $x_j$ are the support vectors, $\alpha_i$ and $\alpha_j$ are the Lagrange constants of the associated support vector, and $N_{SV}$ is a number of the support vectors included in the set of support vectors. An observation vector z is indicated as an outlier when $\text{dist}^2(z) > R^2$, where $$\text{dist}^2(z) = (z \cdot z) - 2\Sigma_{i=1}^{N_{SV}} \alpha_i(x_i \cdot z) + \Sigma_{i=1}^{N_{SV}} \Sigma_{j=1}^{N_{SV}} \alpha_i \alpha_j (x_i \cdot x_j). \quad (9)$$

When the outlier fraction f is very small, the penalty constant C is very large resulting in few if any observation vectors in training dataset 124 determined to be in the outside position according to equation (7).

Figure 2:
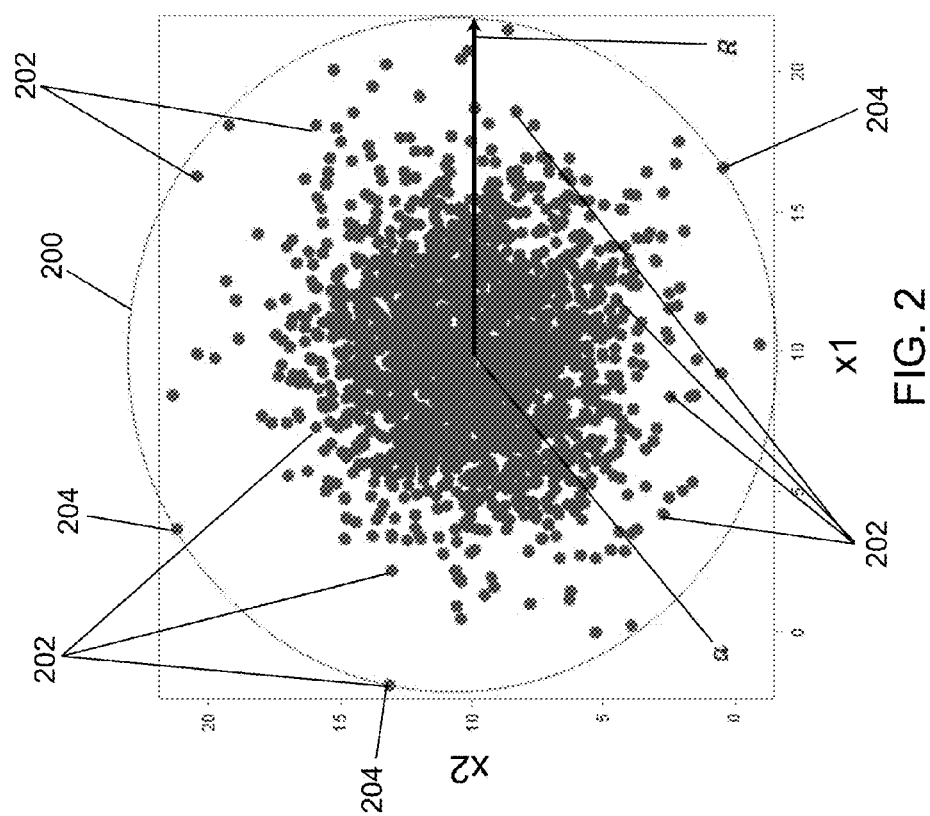
FIG. 2 depicts an SVDD result defining a normal data description in accordance with an illustrative embodiment.

Referring to FIG. 2, an SVDD is illustrated in accordance with an illustrative embodiment that defines a boundary 200 having a radius R from a center a. Boundary 200 is characterized by observation vectors 202 (shown as data points on the graph), which are the set of support vectors SV. For illustration, observation vectors 202 are defined by values of variables x1 and x2 though observation vectors 202 may include a greater number of variables. The $SV_{<C}$ 204 are the subset of support vectors SV on boundary 200.

Normal data description 200 can include a significant amount of space with a very sparse distribution of training observations. Scoring with this model can increase the probability of false positives. Hence, instead of a circular shape, a compact bounded outline around the data that approximates a shape of data in training dataset 124 may be preferred. This is possible using a kernel function. The SVDD is made flexible by replacing the inner product $(x_i \cdot x_j)$ with a suitable kernel function $K(x_i, x_j)$. A Gaussian kernel function is described herein, though this is not intended to be limiting. For example, any exponential function or polynomial function may be used. The Gaussian kernel function may be defined as:

$$K(x_i, x_j) = \exp \frac{-\|x_i - x_j\|^2}{2s^2} \quad (10)$$

where s is a kernel parameter that is termed a Gaussian bandwidth parameter.

The objective function for the SVDD model with the Gaussian kernel function is $$\max(\Sigma_{i=1}^{n} \alpha_i K(x_i, x_i) - \Sigma_{i=1}^{n} \Sigma_{j=1}^{n} \alpha_i \alpha_j K(x_i, x_j)), \quad (11)$$

subject to:

$$\Sigma_{i=1}^{n} \alpha_i = 1, \quad (12)$$

$$0 \leq \alpha_i \leq C, \forall i=1, \ldots, n \quad (13)$$

where again SV is the set of support vectors that includes the observation vectors in training dataset 124 that have $C \geq \alpha_i > 0$ after solving equation (1) above. $SV_{<C}$ is the subset of the support vectors that includes the observation vectors in training dataset 124 that have $C > \alpha_i > 0$ after solving equation (1) above.

The results from equations (4) to (7) above remain valid. A threshold R is computed using:

$$R^2 = K(x_k, x_k) - 2\Sigma_{i=1}^{N_{SV}} \alpha_i K(x_i, x_j) + \Sigma_{i=1}^{N_{SV}} \Sigma_{j=1}^{N_{SV}} \alpha_i \alpha_j K(x_i, x_j) \quad (14)$$

where any $x_k \in SV_{<C}$, where $x_i$ and $x_j$ are the support vectors, $\alpha_i$ and $\alpha_j$ are the Lagrange constants of the associated support vector, and $N_{SV}$ is a number of the support vectors included in the set of support vectors.

An observation vector z is indicated as an outlier when $\text{dist}^2(z) > R^2$, where $$\text{dist}^2(z) = K(z, z) - 2\Sigma_{i=1}^{N_{SV}} \alpha_i K(x_i, z) + \Sigma_{i=1}^{N_{SV}} \Sigma_{j=1}^{N_{SV}} \alpha_i \alpha_j K(x_i, x_j). \quad (15)$$

$\sum_{i=1}^{N_{SV}} \sum_{j=1}^{N_{SV}} \alpha_i \alpha_j K(x_i, x_j)$ is a constant that can be denoted as W and that can be determined from the set of support vectors. $R^2$ is a threshold determined using the set of support vectors. For a Gaussian kernel function, $K(z,z)=1$. Thus, equation (14) can be simplified to $dist^2(z)=1-2\sum_{i=1}^{N_{SV}} \alpha_i K(x_i,z)+W$ for a Gaussian kernel function.

Figure 3:
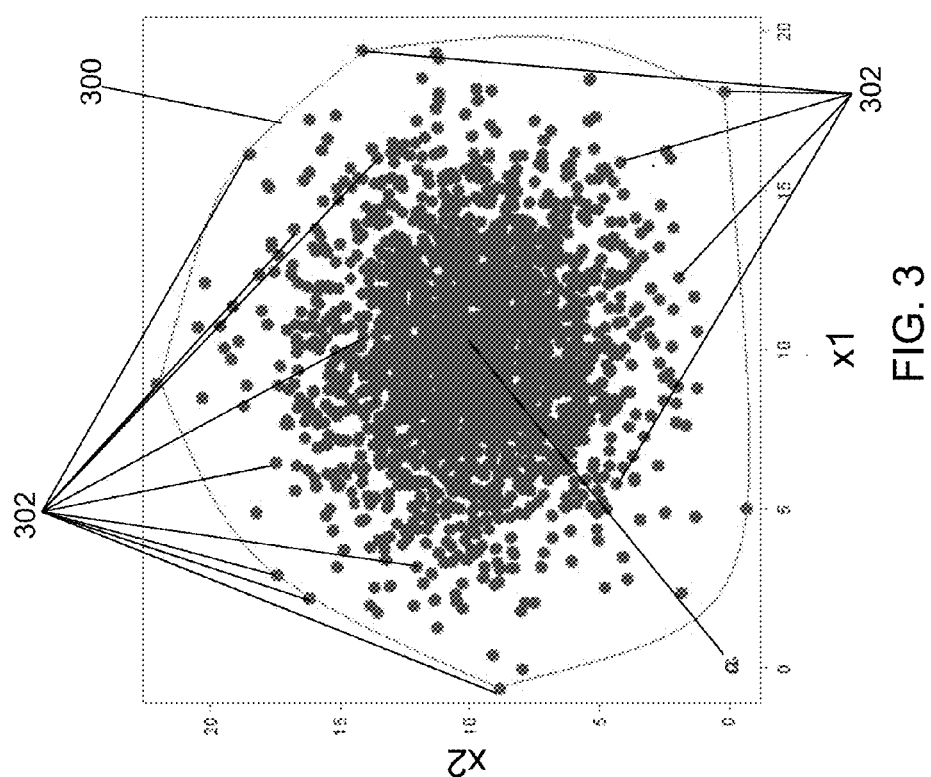
FIG. 3 depicts an SVDD result defining a flexible data description using a Gaussian kernel function in accordance with an illustrative embodiment.

Referring to FIG. 3, a SVDD is shown in accordance with an illustrative embodiment that defines a flexible boundary 300. The SVDD is characterized by support vectors 302, which are the set of support vectors SV. The $SV_{<C}$ are the subset of support vectors SV shown on flexible boundary 300.

Referring to FIGS. 4A, 4B, 4C, and 4D, example operations associated with training application 122 are described. For example, training application 122 may be used to create SVDD 126 from training dataset 124. Instead of using all observations from training dataset 124, training application 122 computes SVDD 126 by iteratively computing an SVDD on independent random samples obtained from training dataset 124 and combining them. Training application 122 has been shown to work well even when the random samples have only a few observations.

Additional, fewer, or different operations may be performed depending on the embodiment of training application 122. The order of presentation of the operations of FIGS. 4A, 4B, 4C, and 4D is not intended to be limiting. Although some of the operational flows are presented in sequence, the various operations may be performed in various repetitions, concurrently (in parallel, for example, using threads and/or a distributed computing system), and/or in other orders than those that are illustrated. For example, a user may execute training application 122, which causes presentation of a first user interface window, which may include a plurality of menus and selectors such as drop down menus, buttons, text boxes, hyperlinks, etc. associated with training application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by training application 122.

Referring to FIG. 4A, in an operation 400, a first indicator may be received that indicates training dataset 124. For example, the first indicator indicates a location and a name of training dataset 124. As an example, the first indicator may be received by training application 122 after selection from a user interface window or after entry by a user into a user interface window. In an alternative embodiment, training dataset 124 may not be selectable. For example, a most recently created dataset may be used automatically.

In an operation 402, a second indicator may be received that indicates a plurality of variables of training dataset 124 to define $x_i$. The second indicator may indicate that all or only a subset of the variables stored in training dataset 124 be used to define SVDD 126. For example, the second indicator indicates a list of variables to use by name, column number, etc. In an alternative embodiment, the second indicator may not be received. For example, all of the variables may be used automatically.

In an operation 404, a third indicator is received that indicates a data filter for a plurality of observations of training dataset 124. The third indicator may indicate one or more rules associated with selection of an observation from the plurality of observations of training dataset 124. In an alternative embodiment, the third indicator may not be received. For example, no filtering of the plurality of observations may be applied. As an example, data may be captured for a vibration level of a washing machine. A washing machine mode, such as "fill", "wash", "spin", etc. may be captured. Because a "normal" vibration level may be different dependent on the washing machine mode, a subset of data may be selected for a specific washing machine mode setting based on a value in a column of training dataset 124 that defines the washing machine mode. For example, SVDD models may be defined for different modes of the machine such that the data filter identifies a column indicating the washing machine mode and which value(s) is(are) used to define the SVDD model.

In an operation 406, a fourth indicator may be received that indicates an initial sample size $N_i$ and a sample size increment $\Delta n$, where a sample size $N_s$ is initialized using the initial sample size as $N_s=N_i$. The fourth indicator indicates an initial number of observations to use from training dataset 124, a percentage of observations to use from training dataset 124, etc. The sample having the sample size $N_i$ may be selected from the filtered plurality of observations. $N_i$ may be very small. For illustration, $N_i$ may be selected to be 0.1% of a total number of observations included in training dataset 124, and $\Delta n$ may be selected to be 0.1% of the total number of observations. $N_i$ observations may be created from training dataset 124 by sampling. An example sampling algorithm is uniform sampling though other random sampling algorithms may be used. In an alternative embodiment, the fourth indicator may not be received. For example, a default value may be stored, for example, in computer-readable medium 108 and used automatically. In another alternative embodiment, the value of the initial sample size $N_i$ and a sample size increment $\Delta n$ may not be selectable. Instead, fixed, predefined values may be used.

In an operation 408, a fifth indicator of a kernel function to apply may be received. For example, the fifth indicator indicates a name of a kernel function. The fifth indicator may be received by training application 122 after selection from a user interface window or after entry by a user into a user interface window. A default value for the kernel function may further be stored, for example, in computer-readable medium 108. As an example, a kernel function may be selected from "Gaussian", "Exponential", etc. For example, a default kernel function may be the Gaussian kernel function though any positive definite kernel function could be used. Of course, the kernel function may be labeled or selected in a variety of different manners by the user as understood by a person of skill in the art. In an alternative embodiment, the kernel function may not be selectable, and a single kernel function is implemented in training application 122. For example, the Gaussian kernel function may be used by default or without allowing a selection.

In an operation 410, a sixth indicator of a range of kernel parameter values to use with the kernel function may be received. For example, a starting value for s denoted $s_n$, an ending value for s denoted $s_x$, and an incremental value for s denoted $\Delta s$ may be received for the Gaussian kernel function. In an alternative embodiment, the sixth indicator may not be received. For example, default values for the range of kernel parameter values may be stored, for example, in computer-readable medium 108 and used automatically. In another alternative embodiment, the range of values of the kernel parameter may not be selectable. Instead, fixed, predefined values may be used.

In an operation 412, a seventh indicator of a value of the expected outlier fraction f may be received. In an alternative embodiment, the seventh indicator may not be received. For example, a default value may be stored, for example, in computer-readable medium 108 and used automatically. In another alternative embodiment, the value of the expected outlier fraction f may not be selectable. Instead, a fixed, predefined value may be used.

In an operation 414, a value of the penalty constant $C=1/N_{if}$ may be computed from $N_i$ and f.

In an operation 416, an eighth indicator of a value of a maximum number of iterations M may be received. In an alternative embodiment, the eighth indicator may not be received. For example, a default value may be stored, for example, in computer-readable medium 108 and used automatically or the maximum number of iterations M may not be used. In another alternative embodiment, the value of the maximum number of iterations M may not be selectable. Instead, a fixed, predefined value may be used. The maximum number of iterations M may be identified as a first stop criterion. The maximum number of iterations M may be selected to stop execution when convergence is not being reached. Merely for illustration, the maximum number of iterations M may be set between 10 and 1000 though the user may determine that other values are more suitable for their application as understood by a person of skill in the art, for example, on the accuracy desired, computing resources available, etc.

In an operation 418, a ninth indicator of a convergence test may be received. For example, the ninth indicator indicates a name of a convergence test. The ninth indicator may be received by training application 122 after selection from a user interface window or after entry by a user into a user interface window. A default value for the convergence test may further be stored, for example, in computer-readable medium 108. As an example, a convergence test may be selected from "Max Iterations", "$R^2$ only", "a only", "$R^2$ and a", etc. For example, a default convergence test may be "$R^2$ and a" as discussed further below. Of course, the convergence test may be labeled or selected in a variety of different manners by the user as understood by a person of skill in the art. In an alternative embodiment, the convergence test may not be selectable, and a single convergence test is implemented by training application 122. For example, the convergence test "$R^2$ and a" as discussed further below may be used by default or without allowing a selection.

In an operation 420, a tenth indicator of a value of a distance tolerance value $\epsilon_R$ may be received if the convergence test selected includes an evaluation of changes in value of the threshold $R^2$ from iteration to iteration. In an alternative embodiment, the tenth indicator may not be received. For example, a default value may be stored, for example, in computer-readable medium 108 and used automatically or the distance tolerance value $\epsilon_R$ may not be used. In another alternative embodiment, the value of the distance tolerance parameter may not be selectable. Instead, a fixed, predefined value may be used. The distance tolerance parameter $\epsilon_R$ may be identified as a second stop criterion.

In an operation 422, an eleventh indicator of a value of a center tolerance value $\epsilon_a$ may be received if the convergence test selected includes an evaluation of changes in a center a from iteration to iteration. In an alternative embodiment, the eleventh indicator may not be received. For example, a default value may be stored, for example, in computer-readable medium 108 and used automatically or the center tolerance parameter $\epsilon_a$ may not be used. In another alternative embodiment, the value of the center tolerance parameter may not be selectable. Instead, a fixed, predefined value may be used. The center tolerance parameter $\epsilon_a$ may be identified as a third stop criterion. Values for the tolerance parameters $\epsilon_R$ and/or $\epsilon_a$ may be selected to achieve a representational quality of training dataset 124 by SVDD 126.

In an operation 424, a twelfth indicator of a value of a number of consecutive iterations for convergence to be complete t may be received. In an alternative embodiment, the twelfth indicator may not be received. For example, a default value may be stored, for example, in computer-readable medium 108 and used automatically or the number of consecutive iterations for convergence to be complete t may not be used. In another alternative embodiment, the value of the number of consecutive iterations for convergence to be complete may not be selectable. Instead, a fixed, predefined value may be used. Use of the number of consecutive iterations for convergence to be complete avoids convergence to a local extrema by requiring that the stop criterion be satisfied for a consecutive number of iterations. Merely for illustration, the number of consecutive iterations for convergence to be complete t may be set between 1 and 10 though the user may determine that other values are more suitable for their application. The number of consecutive iterations for convergence to be complete t set to a value of 5 has been used to achieve quality results for SVDD 126.

In an operation 426, a thirteenth indicator of a value of a number of sample computations per iteration q may be received. In an alternative embodiment, the thirteenth indicator may not be received. For example, a default value may be stored, for example, in computer-readable medium 108 and used automatically or the number of sample computations per iteration q may not be used. In another alternative embodiment, the value of the number of sample computations per iteration may not be selectable. Instead, a fixed, predefined value may be used. Merely for illustration, the number of sample computations per iteration q may be set between 1 and 5 though the user may determine that other values are more suitable for their application. The sample computations per iteration q set to a value of 2 or 3 has been used to achieve quality results for SVDD 126.

In an operation 428, a fourteenth indicator of a first difference curve fit function to apply is received. For example, the fourteenth indicator indicates a name of a first difference curve fit function. The fourteenth indicator may be received by training application 122 after selection from a user interface window or after entry by a user into a user interface window. A default value for the first difference curve fit function may further be stored, for example, in computer-readable medium 108. As an example, a first difference curve fit function may be selected from "None", "Linear", "Penalized B-spline", etc. Of course, the first difference curve fit function may be labeled or selected in a variety of different manners by the user as understood by a person of skill in the art. In an alternative embodiment, the first difference curve fit function may not be selectable, and a single first difference curve fit function is implemented in training application 122. For example, a penalized B-spline function may be used by default or without allowing a selection.

In an operation 429, a first value for the kernel parameter is selected. For example, the kernel parameter may be s when the kernel function selected is the Gaussian kernel function, and $s=s_n$ is selected.

In an operation 430, a first set of observation vectors $x_i$ are randomly selected from training dataset 124, for example, using uniform random sampling to select the sample size $N_s$ number of observations. The first set of observation vectors $x_i$ further may be selected that satisfy the data filter defined in operation 404. Each observation vector $x_i$ includes values for each of the plurality of variables indicated in operation 402.

In an operation 431, an optimal value for the objective function is computed by optimizing the objective function using the kernel function defined based on the fourth indicator and the selected first set of observation vectors $x_i$ such that $n=N_s$. For example, equations (11)-(13) above are used to solve for SV, a first set of support vectors that have $0<\alpha_i \leq C$. As part of the solving for the optimal solution, values for the computed penalty constant C and/or the kernel parameter value may be used as indicated above and/or updated below. Values for the Lagrange constants $\alpha_i$ for each support vector of the first set of support vectors, for $R^2$ using equation (14), and for the center position a using equation (4) are computed as part of the optimal solution. Only the $SV_{<C}$ are needed for the computations of $R^2$, and only the SV are needed for the computations of a, which avoids an additional read of training dataset 124 thereby improving performance.

In an operation 432, iteration counter values i and k may be initialized. For example, i may be initialized to one, and k may be initialized to zero. i may be identified as an iteration counter, and k may be identified as a consecutive convergence counter.

Figure 4B:
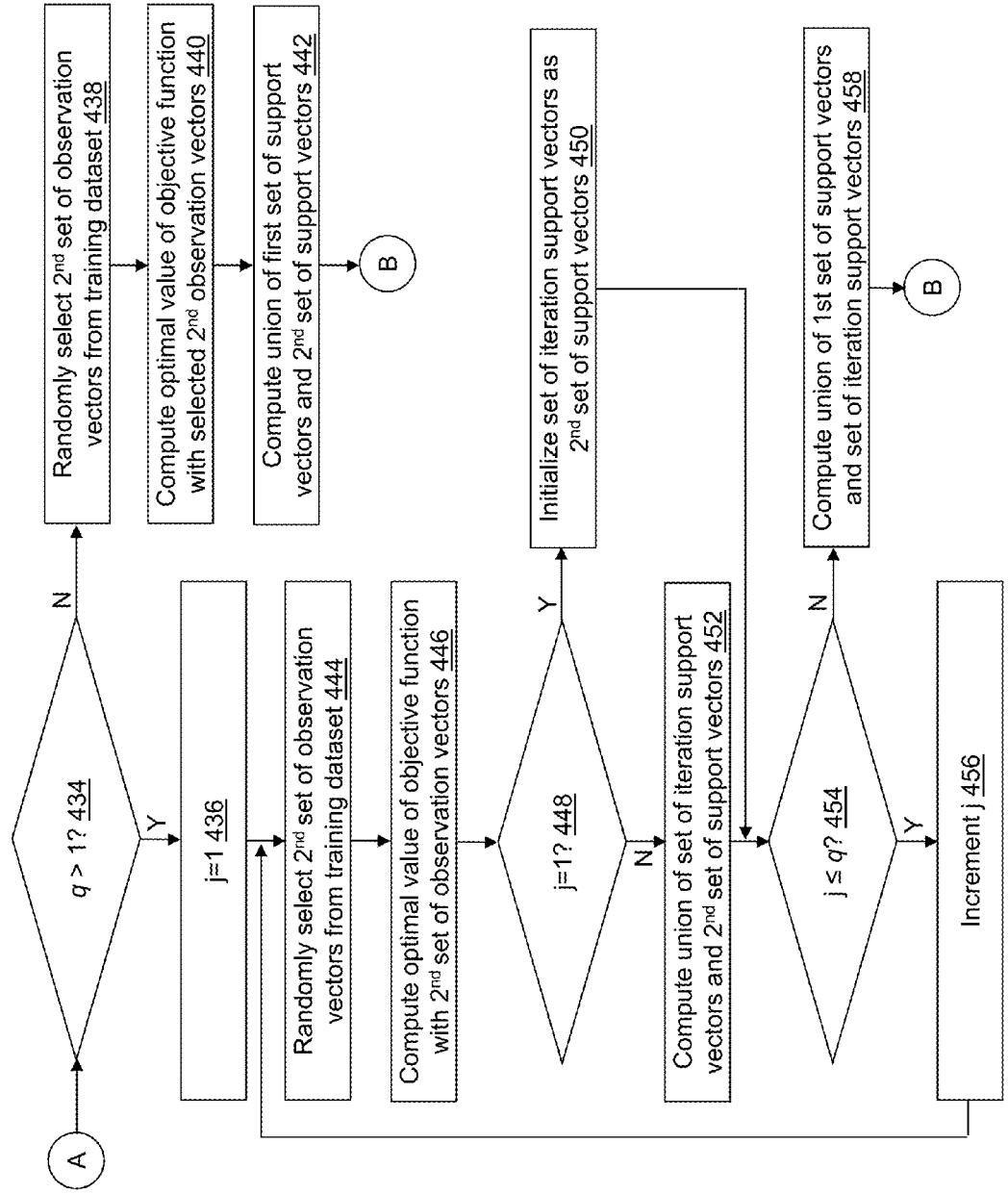

Referring to FIG. 4B, in an operation 434, a determination is made concerning whether or not the number of sample computations per iteration q>1. In an alternative embodiment, the number of sample computations per iteration, q may not be used, in which case, operations 434, 436, and 444-458 are not implemented by training application 122. As another option, the sample computations per iteration may be implemented by training application 122, but not selected for use by the user by setting q≤1 to skip operations 434, 436, and 444-458. When q>1, processing continues in an operation 436. When q≤1, processing continues in an operation 438.

In operation 436, a sampling iteration counter value j may be initialized, and processing continues in an operation 444. For example, j may be initialized to one.

In an operation 438, a second set of observation vectors $x_i$ are randomly selected from training dataset 124, for example, using uniform random sampling to select the sample size $N_s$ number of observations a next time. The second set of observation vectors $x_i$ further may be selected that satisfy the data filter defined in operation 404. Each second observation vector $x_i$ includes values for each of the plurality of variables indicated in operation 402.

In an operation 440, an optimal value for the objective function is computed by optimizing the objective function using the kernel function defined based on the fourth indicator and the selected second set of observation vectors $x_i$ such that $n=N_s$. For example, equations (11)-(13) above are used to solve for SV, a second set of support vectors that have $0<\alpha_i \leq C$. Values for the Lagrange constants $\alpha_i$ for each support vector of the second set of support vectors, for $R^2$ using equation (14), and for the center position a using equation (4) are computed as part of the optimal solution.

Figure 4C:
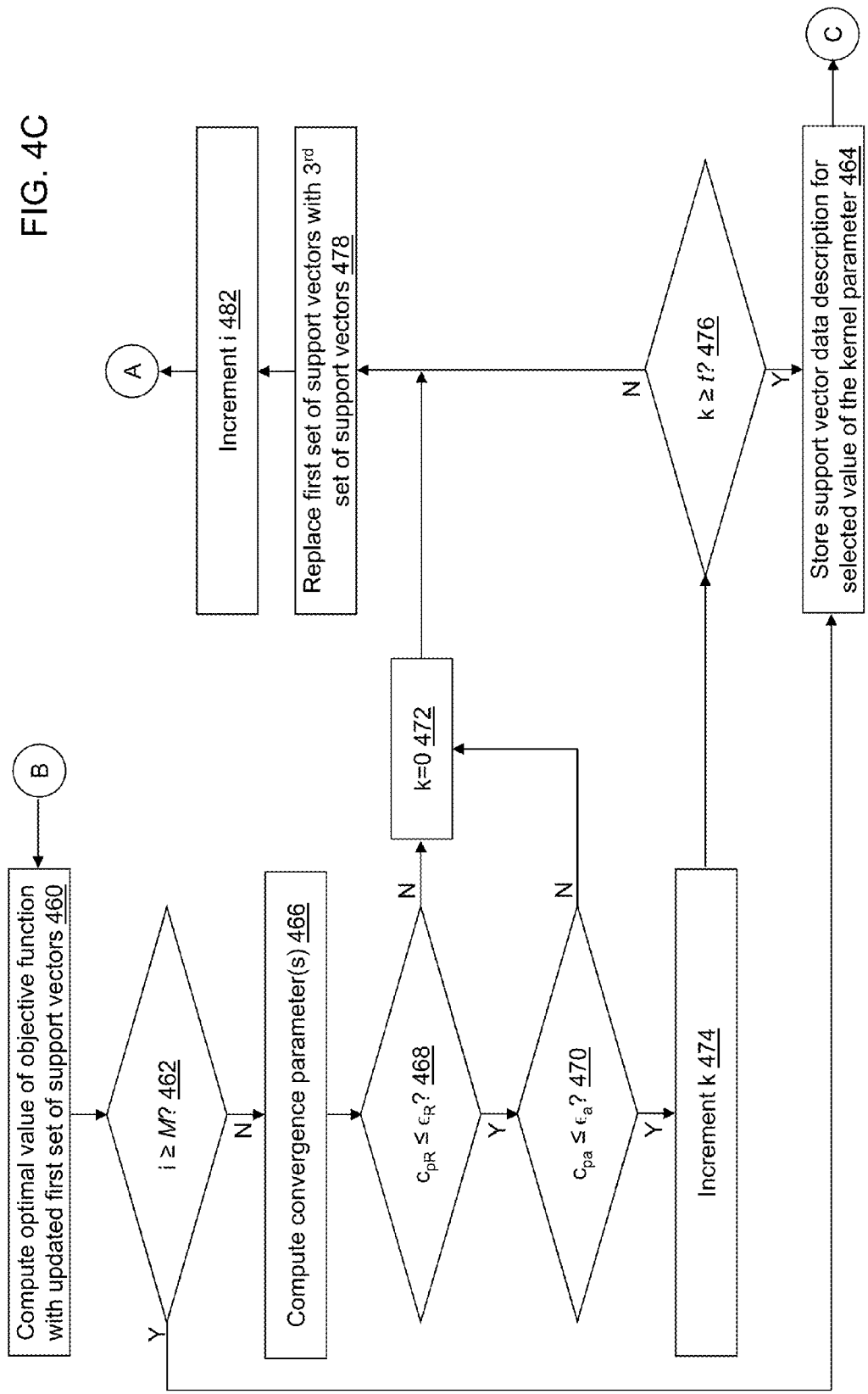

In an operation 442, a union of the first set of support vectors and the second set of support vectors SV computed in operation 440 is computed, the first set of support vectors is updated as the union of the support vectors, and processing continues in an operation 460 shown referring to FIG. 4C. $n=n_1+n_2-n_{Dupl}$, where n is a number of vectors of the updated first set of support vectors, $n_1$ is a number of the first set of support vectors SV, $n_2$ is a number of the second set of support vectors SV, and $n_{Dupl}$ is a number of duplicate support vectors of the first set of support vectors SV and the second set of support vectors SV.

In operation 444, the second set of observation vectors $x_i$ are randomly selected from training dataset 124, for example, using uniform random sampling to select the sample size $N_s$ number of observations a next time. The second set of observation vectors $x_i$ further may be selected that satisfy the data filter defined in operation 404. Each second observation vector $x_i$ includes values for each of the plurality of variables indicated in operation 402.

In an operation 446, an optimal value for the objective function is computed by optimizing the objective function using the kernel function defined based on the fourth indicator and the selected second set of observation vectors $x_i$ such that n=N. For example, equations (11)-(14) above are used to solve for SV, a second set of support vectors that have $0<\alpha_i \leq C$. Values for the Lagrange constants $\alpha_i$ for each support vector of the second set of support vectors, for $R^2$ using equation (14), and for the center position a using equation (4) are computed as part of the optimal solution.

In an operation 448, a determination is made concerning whether or not sampling iteration counter value j=1. When j=1, processing continues in an operation 450. When j≠1, processing continues in an operation 452.

In operation 450, a set of iteration support vectors is initialized with the second set of support vectors SV computed in operation 446, and processing continues in an operation 454.

In operation 452, a union of the set of iteration support vectors and the second set of support vectors SV computed in operation 446 is computed, the set of iteration support vectors is updated as the union of the support vectors, and processing continues in operation 454.

In operation 454, a determination is made concerning whether or not the number of sample computations per iteration q have been performed by comparing the sampling iteration counter value j to the number of sample computations per iteration q. When j≤q, processing continues in an operation 456. When j>q, processing continues in an operation 458.

In operation 456, the sampling iteration counter value j is incremented by adding one to the current value, and processing continues in operation 444 to process a next sampled set of observation vectors to supplement the set of iteration support vectors.

In operation 458, a union of the first set of support vectors and the set of iteration support vectors is computed, the first set of support vectors is updated as the union of the support vectors, and processing continues in operation 460 shown referring to FIG. 4C. $n=n_1+n_i-n_{Dupl2}$, where n is a number of vectors of the updated first set of support vectors, $n_1$ is a number of the first set of support vectors SV, $n_i$ is a number of the set of iteration support vectors, and $n_{Dupl2}$ is a number of duplicate support vectors of the first set of support vectors SV and the set of iteration support vectors.

Referring to FIG. 4C, in operation 460, an optimal value for the objective function is computed by optimizing the objective function using the kernel function defined based on the fourth indicator and the updated first set of support vectors from operation 442 or operation 458. For example, equations (11)-(14) above are used to solve for SV, a third set of support vectors. Values for the Lagrange constants $\alpha_i$ for each support vector of the third set of support vectors, for $R^2$ using equation (14), and for the center position a using equation (4) are computed as part of the optimal solution.

In an operation 462, a determination is made concerning whether or not i≥M. In an alternative embodiment, the maximum number of iterations M may not be used, in which case, operation 462 is not implemented by training application 122. When i≥M, processing continues in an operation 464. When i<M, processing continues in an operation 466. i≥M is a first stop condition.

In operation 464, the third set of support vectors, $\alpha_i$, the Lagrange constants for each of the third set of support vectors, the center position a, and/or $R^2$ computed from the third set of support vectors are stored, for example, in computer-readable medium 108, in association with a current kernel parameter value such as s, and processing continues in operation 484 shown referring to FIG. 4D. Any other constants associated with the third set of support vectors further may be stored. For example, K(z,z)=1 may be stored when the Gaussian kernel function is used and/or $W=\Sigma_{i=1}^{N_{SV}}\Sigma_{j=1}^{N_{SV}}\alpha_i\alpha_j K(x_i,x_j)$ may be stored for use in computing $dist^2(z)$ when scoring is performed as discussed further below where $N_{SV}$ is a number of support vectors of the third set of support vectors.

In operation 466, one or more convergence parameters may be computed as additional stop conditions dependent on the convergence test indicated in operation 418. For example, when "Max Iterations" is indicated, none of operations 466-476 may be performed and no convergence parameters are computed. When "$R^2$" is indicated, operation 470 may be skipped, and only an $R^2$ convergence parameter is computed. When "a" is indicated, operation 468 may be skipped and only an a convergence parameter is computed. When "$R^2$ and a" is indicated, $R^2$ and a convergence parameters are both computed.

The $R^2$ convergence parameter may be computed as $c_{pR}=\|R_j^2-R_{j-1}^2\|/R_{j-1}^2$, where $R_j^2$ is the threshold computed using the third set of support vectors that have $0<\alpha_i<C$ computed in operation 460, and $R_{j-1}^2$ is the threshold computed using the first set of support vectors that have $0<\alpha_i<C$. Prior to computing $c_{pR}$, a value of $R_{j-1}^2$ may be tested to determine if the value is zero. If so, $c_{pR}$ may be set to a very large value.

The a convergence parameter may be computed as $c_{pa}=\|a_j^2-a_{j-1}\|/a_{j-1}$, where $a_j=\Sigma_{i=1}^{N_{SV}}\alpha_i x_i$ is computed using the third set of support vectors as $x_i$, and $a_{i-1}=\Sigma_{i=1}^{N_{SV1}}\alpha_i x_i$ is computed using the first set of support vectors as $x_i$, $N_{SV}$ is a number of support vectors of the third set of support vectors, and $N_{SV1}$ is a number of support vectors of the first set of support vectors. Prior to computing $c_{pa}$, a value of $a_{i-1}$ may be tested to determine if the value is zero. If so, $c_{pa}$ may be set to a very large value.

In an operation 468, a determination is made concerning whether or not $c_{pR}\leq\epsilon_R$, $c_{pR}\leq\epsilon_R$ is a second stop condition. When $c_{pR}\leq\epsilon_R$, processing continues in an operation 470. When $c_{pR}>\epsilon_R$, processing continues in an operation 472.

In operation 470, a determination is made concerning whether or not $c_{pa}\leq\epsilon_a$. $c_{pa}\leq\epsilon_a$ is a third stop condition. When $c_{pa}\leq\epsilon_a$, processing continues in an operation 474. When $c_{pa}>\epsilon_a$, processing continues in operation 472.

In operation 472, the consecutive convergence counter k is reset to zero to indicate that convergence has not occurred, and processing continues in an operation 478.

In operation 474, the consecutive convergence counter k is incremented by adding one to the current value, and processing continues in an operation 476.

In operation 476, a determination is made concerning whether or not k≥t. When k≥t, processing continues in operation 464 to complete processing because convergence has occurred for the indicated number of consecutive iterations. When k<t, processing continues in operation 478. k≥t is a fourth stop condition.

In operation 478, the first set of support vectors is replaced with the third set of support vectors computed in operation 460, and processing continues in an operation 482.

In operation 482, the iteration counter i is incremented by adding one to the current value, and processing continues in operation 434 shown referring to FIG. 4B to perform another iteration.

Referring to FIG. 4D, in operation 484, a next value of the kernel parameter is determined by incrementing the current value using the incremental kernel parameter value. For example, s=s+Δs.

In an operation 486, a determination is made concerning whether or not there is another kernel parameter value to evaluate. For example, the next value is compared to the ending value such as s≤$s_x$. When s≤$s_x$, processing continues in operation 430 to compute the optimal values using the next value for the kernel parameter. When s>$s_x$, processing continues in an operation 488. Of course, the evaluations may be inclusive or exclusive of the ending value.

In operation 488, first difference function values between successive optimal values stored in operation 464 are computed. For example, the first difference may be computed as an approximation of the first derivative using $$\frac{df}{ds} \approx dif(s) = \frac{f(s+\Delta s)-f(s)}{\Delta s},$$

where f(s) is the optimal value computed by solving equation (11) subject to equations (12) and (13) in operation 460, and f(s+Δs) is f(s) for a subsequent value of s in operation 460.

In an operation 490, a curve is fit to the first difference function values as a function of the kernel parameter using the first difference curve fit function indicated in operation 428 to define a curve fit equation that smoothes a variation of the first difference function values. For illustration, a penalized B-spline can be fit to the first difference function values computed in operation 488. For illustration, a penalized B-spline curve fit can be implemented using the TRANSREG procedure included with SAS/STAT® software.

In an operation 491, a current value of the kernel parameter such as s is at a first extremum (maximum or minimum) is determined using the defined curve fit equation. For example, values for the optimal value may be computed using the defined curve fit equation with successive values of s starting with the starting value $s_n$ and incrementing s using Δs until the first extremum of the optimal value is identified based on a change in direction of the optimal values from increasing to decreasing or from decreasing to increasing.

In an operation 492, a determination is made concerning whether or not this is a first iteration of operation 492. When this is a first iteration of operation 492, processing continues in operation 497. When this is not a first iteration of operation 492, processing continues in an operation 493.

In operation 493, an absolute value of a difference between the current value of the kernel parameter and a previous value of the kernel parameter is computed as $s_\Delta=\|s_i-s_{i-1}\|$.

In an operation 494, a determination is made concerning whether or not the kernel parameter has converged. When the kernel parameter has converged, processing continues in operation 496. When the kernel parameter has not converged, processing continues in operation 497. For example, the kernel parameter has converged when $s_\Delta$ is either less than a predefined convergence value $s_\Delta \leq \sigma_{CV}$ or is less than or equal to the predefined convergence value $s_\Delta \leq \sigma_{CV}$, where $\sigma_{CV}$ is the predefined convergence value. Convergence further may be determined based on $s_\Delta$ being either less than or being less than or equal to the predefined convergence value for u consecutive iterations of operation 494 using a counter in a manner similar to that described for t in operations 424, 432, 474, 476 except that the counter $k_u$ is initialized prior to operation 429. The convergence parameter u may be defined by a user or may have a default value, such as 5, that may be stored in computer-readable medium 108 in a manner similar to that described for t in operation 424. For illustration, the predefined convergence value may be defined as $\sigma_{CV} = \Delta s$. As another illustration, the predefined convergence value may be defined as $\sigma_{CV} = \epsilon_s \|s_{i-1}\|$, where $\epsilon_s$ is an epsilon convergence value defined by a user or using a default value, such as 0.05, that may be stored in computer-readable medium 108 in a manner similar to that described for $\epsilon_R$ in operation 420.

In an operation 496, the set of support vectors, $\alpha_i$ the Lagrange constants for each of the set of support vectors, the center position a, and/or $R^2$ computed from the set of support vectors stored in operation 464 in association with the current value of the kernel parameter determined in operation 491 are stored in SVDD 126 in association with the current value of the kernel parameter determined in operation 491.

In operation 497, the previous value of the kernel parameter is defined as the current value of the kernel parameter determined in operation 491.

In an operation 498, the sample size $N_s$ is incremented using the sample size increment $\Delta n$ such that $N_s = N_s + \Delta n$.

In an operation 499, the penalty constant $C = 1/N_{Nf}$ is updated, and processing continues in operation 429 to compute another optimum kernel parameter value with a larger sample size.

Referring to FIG. 5, a first example dataset 500 including a first dimension (variable) x1 and a second dimension (variable) x2 having a star shape is shown for training dataset 124 in accordance with an illustrative embodiment. First example dataset 500 included 582 observations. The operations of FIGS. 4A, 4B, 4C, and 4D were performed with first example dataset 500 for $N_i = 5\%$ or 29 observations, $\Delta n = 1\%$ or 6 observations until all of the observations were included (convergence was not performed to stop execution in operation 494). Values of s from $s_n = 0.05$ to $s_x = 10$ with $\Delta s = 0.05$ were used to compute optimal objective function values for each sample size. The remaining parameters were: $\epsilon_a = \epsilon_R = 1e-5$, $M = 1000$, $f = 0.0001$, $q = 1$, and $t = 10$.

Figure 6:
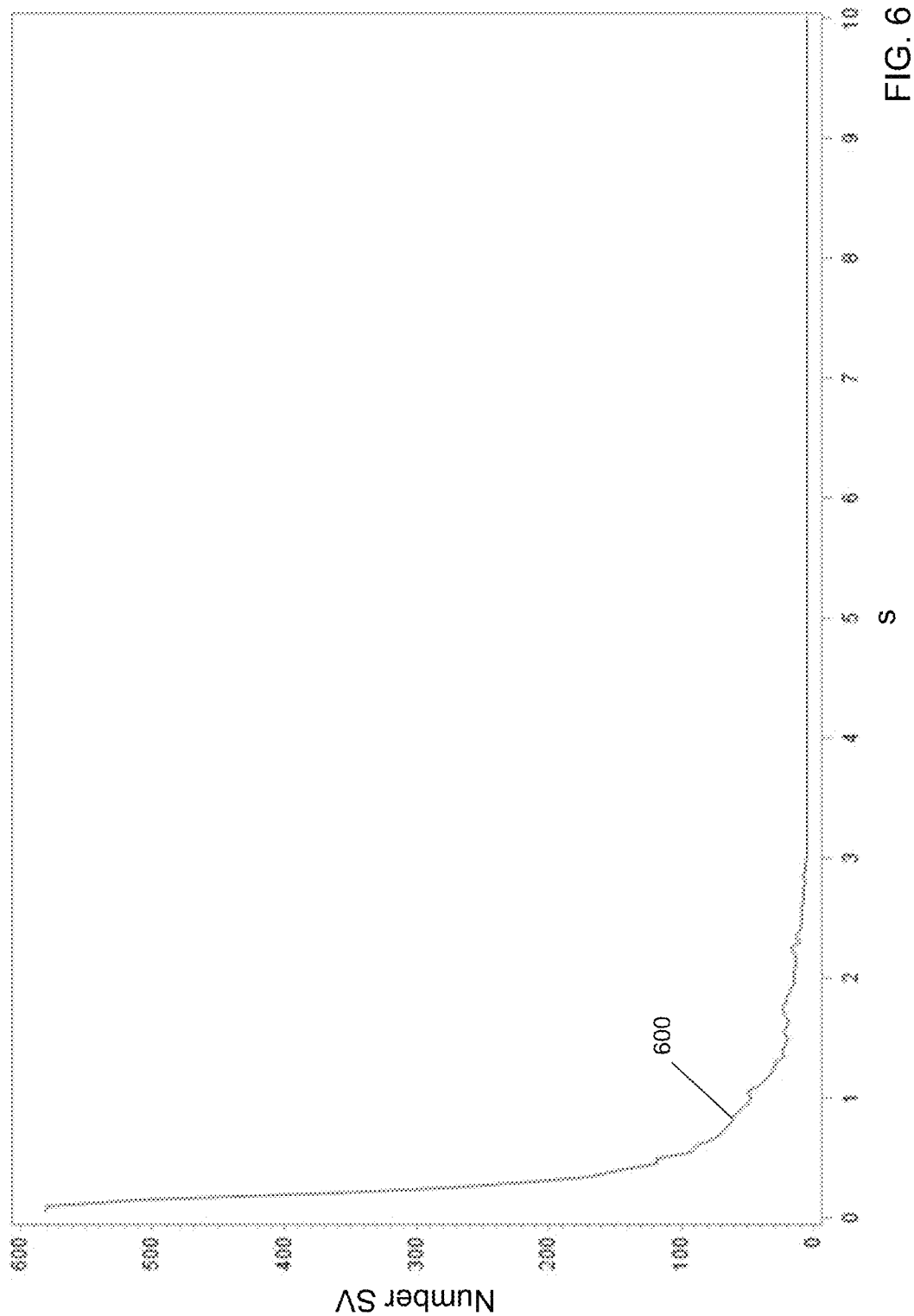
FIG. 6 depicts a value of a number of support vectors as a function of a kernel parameter using the first example dataset of FIG. 5 in accordance with an illustrative embodiment.

The SVDD approach requires solving a quadratic programming problem. The time needed to solve the quadratic programming problem is directly related to the size of training dataset 124. Moreover, the computation time is higher for smaller values of s. With smaller values of s, the solution to the SVDD problem is more complex, resulting in a large number of support vectors and requiring more computational time. For example, FIG. 6 shows a number of support vectors curve 600 as a function of the kernel parameter s using the Gaussian kernel function and first example dataset 500. Low values of the kernel parameter s result in a large number of support vectors. For example, at the starting value of the kernel parameter s, the number of support vectors equals the number of observations. As the kernel parameter s increases, a number of support vectors decreases to a small value.

Figure 7:
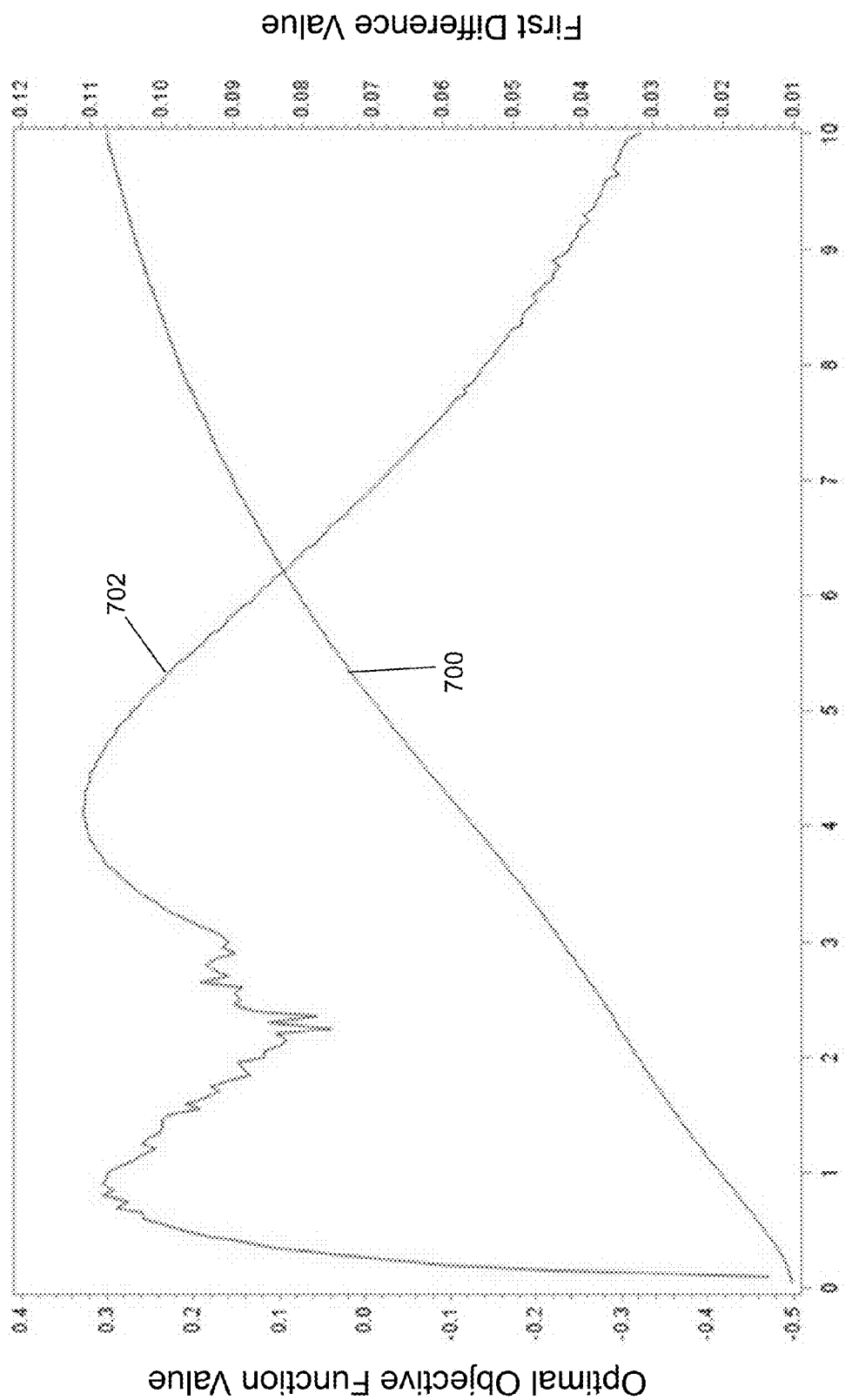
FIG. 7 depicts a value of an optimal objective function (OOF) and a first difference value computed from the OOF as a function of the kernel parameter using the first example dataset of FIG. 5 in accordance with an illustrative embodiment.

Referring to FIG. 7, an optimal value curve 700 depicts the optimal values computed in operation 460 as a function of the kernel parameters using the Gaussian kernel function and first example dataset 500. A first difference curve 702 depicts the first difference values of the optimal values computed in operation 488 as a function of the kernel parameter.

Figure 8A:
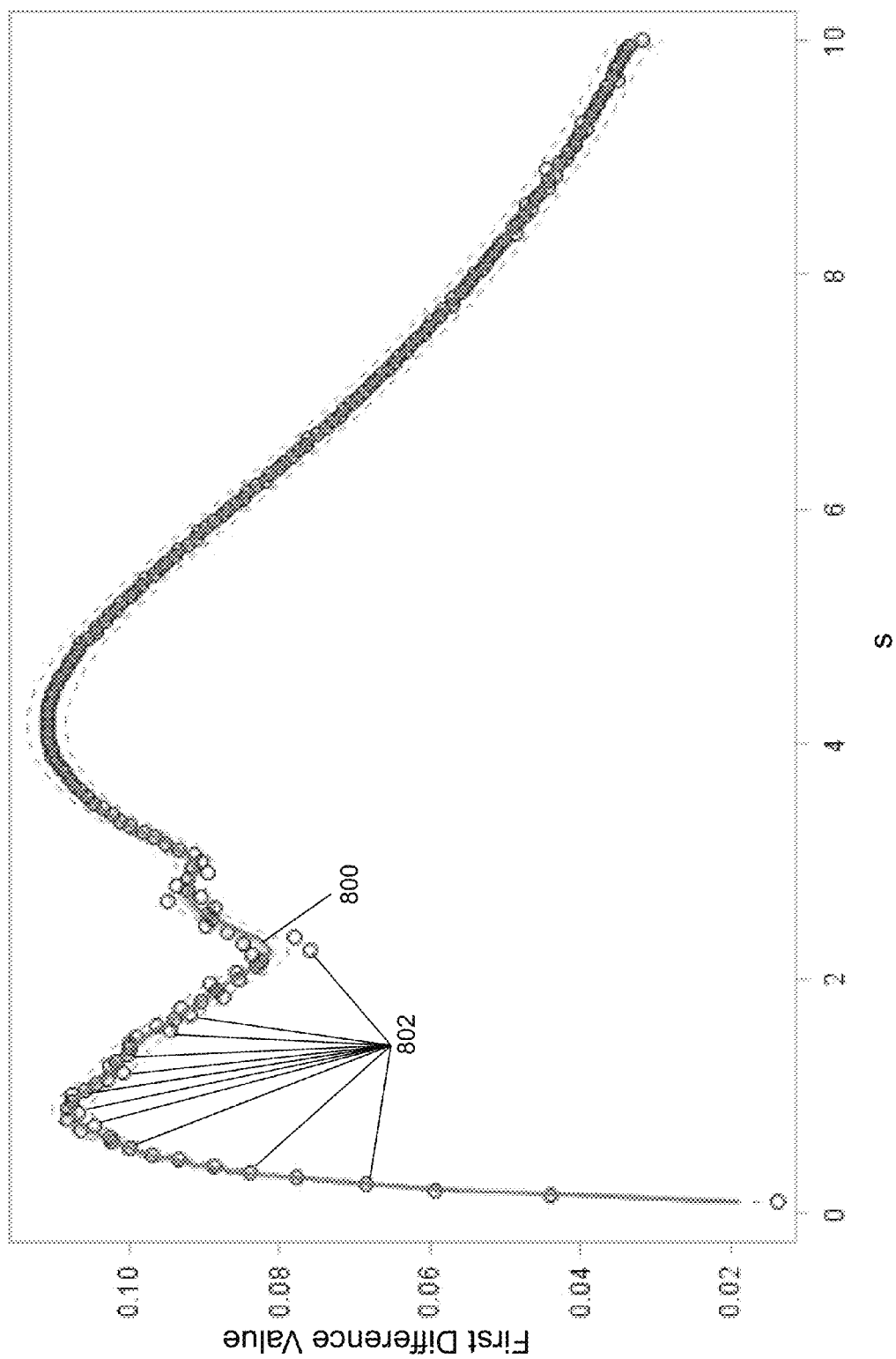
FIG. 8A depicts a curve fit to the first difference value of FIG. 7 computed as a function of the kernel parameter in accordance with an illustrative embodiment.
Figure 8B:
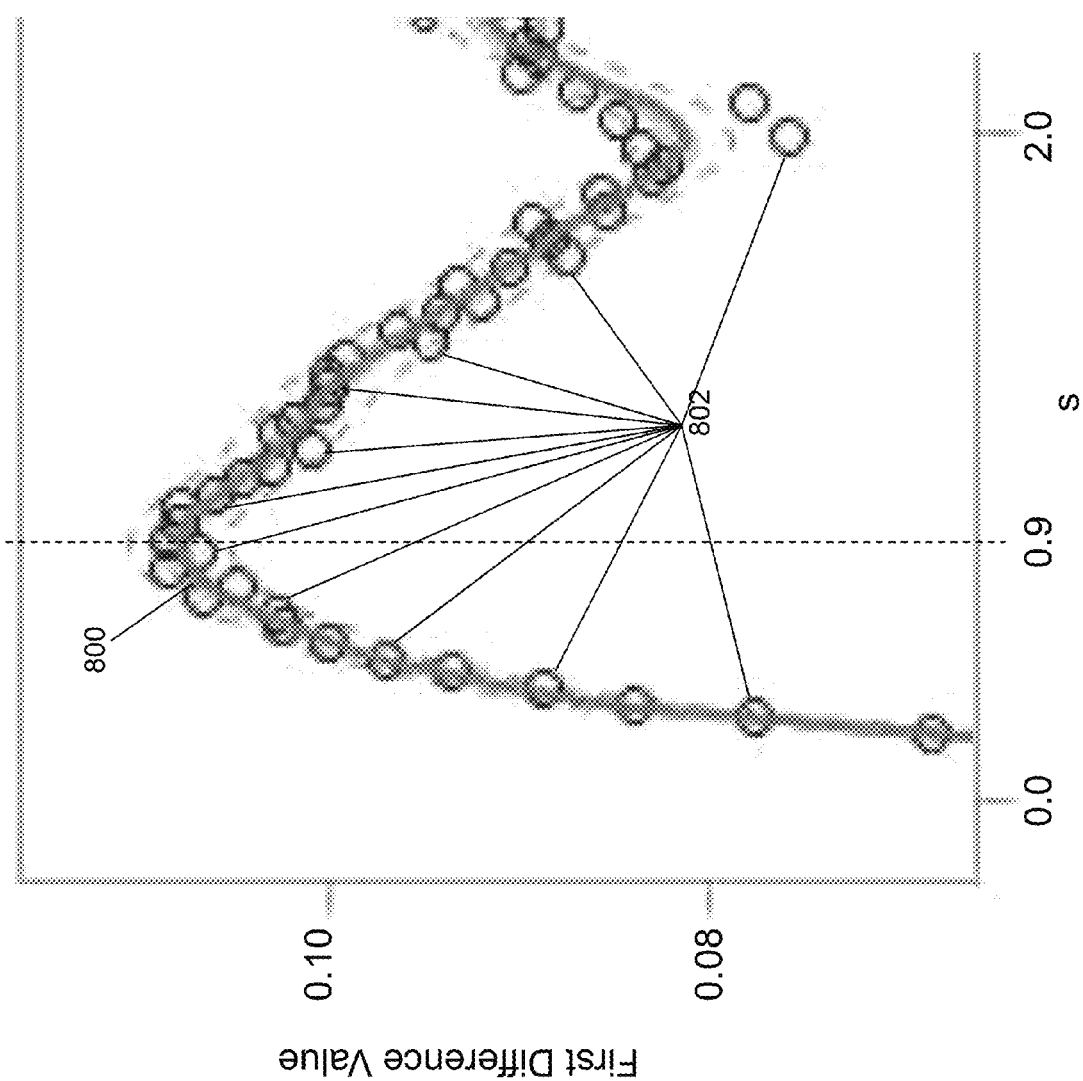
FIG. 8B depicts a zoomed view of the curve fit of FIG. 8A computed as a function of the kernel parameter in accordance with an illustrative embodiment.

Referring to FIG. 8A, a first fit difference curve 800 depicts a penalized B-spline curve fit to the first difference function values 802 of the optimal objective function values. Referring to FIG. 8B, for example, a zoomed view of a first extremum of the first difference values is shown in accordance with an illustrative embodiment. The first extremum may be determined at the kernel parameter value s=0.9.

For each sample size, the first difference function values of the optimal objective function were smoothed using a penalized B-spline to find the first extremum. Referring to FIG. 9, an optimal value curve 900 shows the optimal values of the kernel parameter computed in operation 491 for each fraction of the total sample size for first example dataset 500. Starting from a sample size of 99 (17% of first example dataset 500), the optimal value of the kernel parameter converges to a range [0.85, 0.9], indicating that the overall optimal s is between these two values For extremely large training datasets, efficiency gains can be realized using a distributed implementation. Referring to FIG. 10, a block diagram of an SVDD training system 1000 is shown in accordance with an illustrative embodiment. In an illustrative embodiment, SVDD training system 1000 may include a controller device 1002, one or more worker devices 1004, and a network 1006. For illustration, the one or more worker devices 1004 may include a first worker device 1004a, a second worker device 1004b, . . . , and an nth worker device 1004n. Controller device 1002 and the one or more worker devices 1004 are in communication through network 1006.

Network 1006 may include one or more networks of the same or different types. Network 1006 can be any type of wired and/or wireless public or private network including a cellular network, a local area network, a wide area network such as the Internet or the World Wide Web, etc. Network 1006 further may comprise sub-networks and consist of any number of communication devices.

Controller device 1002 and the one or more worker devices 1004 may include computers of any form factor such as a server computer, a desktop, a smart phone, a laptop, a personal digital assistant, an integrated messaging device, a tablet computer, etc. For illustration, controller device 1002 and the one or more worker devices 1004 are each an instance of SVDD training device 100. Training dataset 124 with $M_s$ observations is distributed across p worker devices 1004. Each worker device computes SVDD 126 for its $M_s/p$ observations using training application 122 to determine its own plurality of support vectors $SV_i^*$, where i indicates the worker device. Once SVDD computations are completed, each worker device sends its plurality of support vectors $SV_i^*$ to controller device 1002. The controller device 1002 forms a union of all the worker device support vectors $SV_i^*$ as $S' = U_{i=1}^{p} SV_i^*$ to create data set S'. An optimal value for the objective function is computed by optimizing the objective function using the kernel function defined based on the fourth indicator and the dataset S'. For example, equations (10)-(13) above are used to solve for SV, a final plurality of support vectors that have $0 < \alpha_i \leq C$, along with values for the Lagrange constants $\alpha_i$ for each support vector of the final plurality of support vectors, the center position a, and $R^2$. The final plurality of support vectors computed by controller device 1002 along with values for the Lagrange constants $\alpha_i$ for each support vector of the final plurality of support vectors, the center position a, and $R^2$ may be stored as SVDD 126. The processing is then repeated for a next value for the sample size.

Figure 11:
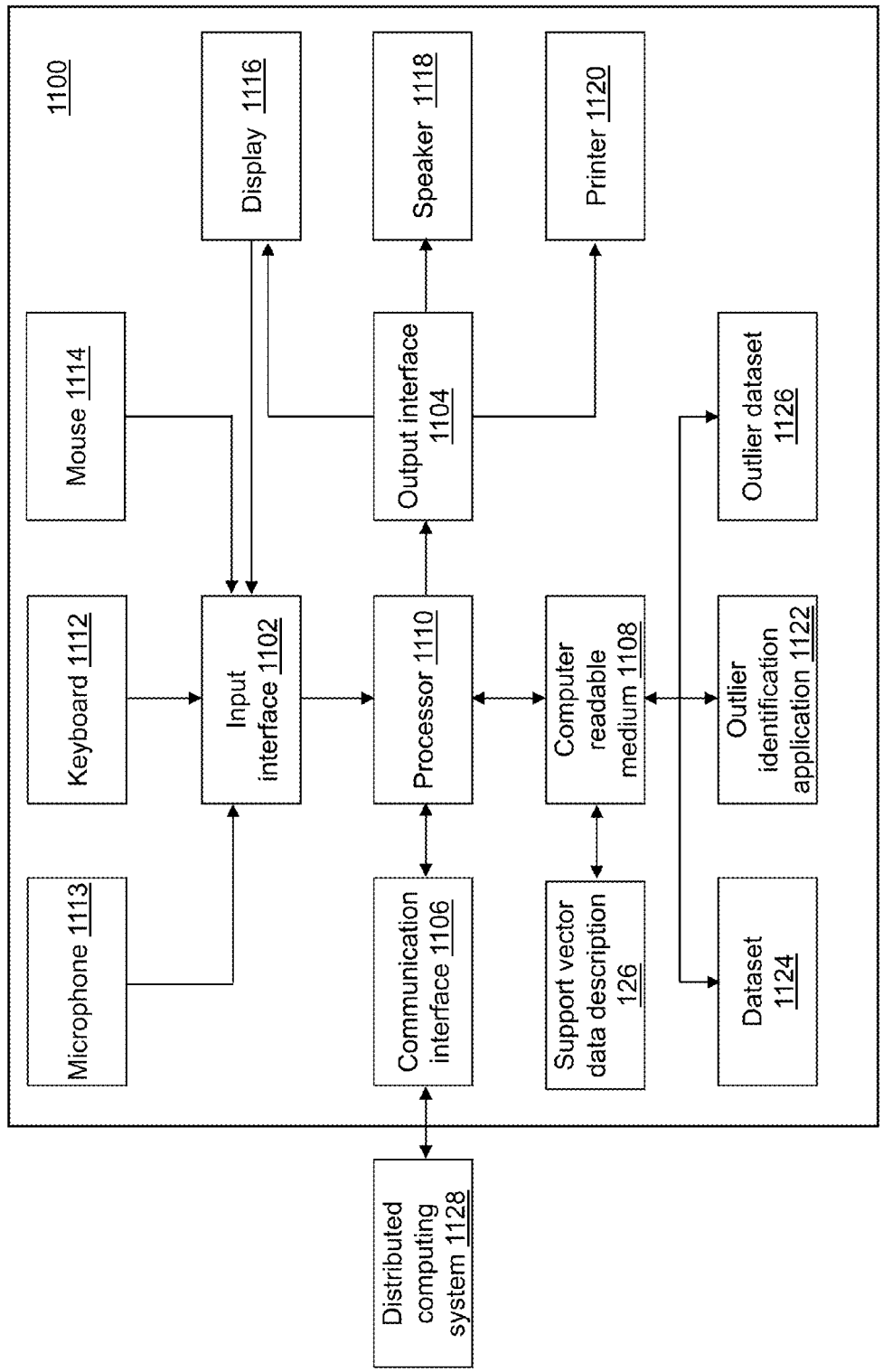
FIG. 11 depicts a block diagram of an outlier identification device in accordance with an illustrative embodiment.

Referring to FIG. 11, a block diagram of an outlier identification device 1100 is shown in accordance with an illustrative embodiment. Outlier identification device 1100 may include a second input interface 1102, a second output interface 1104, a communication interface 1106, a second non-transitory computer-readable medium 1108, a second processor 1110, an outlier identification application 1122, SVDD 126, a scoring dataset 1124, and an outlier dataset 1126. Fewer, different, and/or additional components may be incorporated into outlier identification device 1100. Outlier identification device 1100 and SVDD training device 100 may be the same or different devices.

Second input interface 1102 provides the same or similar functionality as that described with reference to input interface 102 of SVDD training device 100 though referring to outlier identification device 1100. Second output interface 1104 provides the same or similar functionality as that described with reference to output interface 104 of SVDD training device 100 though referring to outlier identification device 1100. Second communication interface 1106 provides the same or similar functionality as that described with reference to communication interface 106 of SVDD training device 100 though referring to outlier identification device 1100. Data and messages may be transferred between outlier identification device 1100 and a distributed computing system 1128 using second communication interface 1106. Second computer-readable medium 1108 provides the same or similar functionality as that described with reference to computer-readable medium 108 of SVDD training device 100 though referring to outlier identification device 1100. Second processor 1110 provides the same or similar functionality as that described with reference to processor 110 of SVDD training device 100 though referring to outlier identification device 1100.

Outlier identification application 1122 performs operations associated with creating outlier dataset 1126 from data stored in dataset 1124 using SVDD 126. SVDD 126 may be used to classify data stored in dataset 1124 and to identify outliers in dataset 1124 that are stored in outlier dataset 1126 to support various data analysis functions as well as provide alert/messaging related to the identified outliers stored in outlier dataset 1126. Dependent on the type of data stored in training dataset 124 and dataset 1124, outlier dataset 1126 may identify anomalies as part of process control, for example, of a manufacturing process, for machine condition monitoring, for example, an electro-cardiogram device, for image classification, for intrusion detection, for fraud detection, etc. Some or all of the operations described herein may be embodied in outlier identification application 1122. The operations may be implemented using hardware, firmware, software, or any combination of these methods.

Referring to the example embodiment of FIG. 11, outlier identification application 1122 is implemented in software (comprised of computer-readable and/or computer-executable instructions) stored in second computer-readable medium 1108 and accessible by second processor 1110 for execution of the instructions that embody the operations of outlier identification application 1122. Outlier identification application 1122 may be written using one or more programming languages, assembly languages, scripting languages, etc. Outlier identification application 1122 may be integrated with other analytic tools. For example, outlier identification application 1122 may be part of SAS® Enterprise Miner™ developed and provided by SAS Institute Inc. of Cary, N.C. that may be used to create highly accurate predictive and descriptive models based on analysis of vast amounts of data from across an enterprise. Data mining is applicable in a variety of industries.

Outlier identification application 1122 may be implemented as a Web application. Outlier identification application 1122 may be integrated with other system processing tools to automatically process data generated as part of operation of an enterprise, to identify any outliers in the processed data, and to provide a warning or alert associated with the outlier identification using second input interface 1102, second output interface 1104, and/or second communication interface 1106 so that appropriate action can be initiated in response to the outlier identification. Outlier identification application 1122 and training application 122 further may be integrated applications.

Training dataset 124 and dataset 1124 may be generated, stored, and accessed using the same or different mechanisms. Similar to training dataset 124, dataset 1124 may include a plurality of rows and a plurality of columns with the plurality of rows referred to as observations or records, and the columns referred to as variables that are associated with an observation. Dataset 1124 may be transposed.

Similar to training dataset 124, dataset 1124 may be stored on second computer-readable medium 1108 or on one or more computer-readable media of distributed computing system 1128 and accessed by outlier identification device 1100 using second communication interface 1106. Data stored in dataset 1124 may be a sensor measurement or a data communication value, may be generated or captured in response to occurrence of an event or a transaction, generated by a device such as in response to an interaction by a user with the device, etc. The data stored in dataset 1124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in dataset 1124 may be captured at different time points periodically, intermittently, when an event occurs, etc. One or more columns may include a time value. Similar to training dataset 124, data stored in dataset 1124 may be generated as part of the IoT, and some or all data may be processed with an ESPE.

Similar to training dataset 124, dataset 1124 may be stored in various compressed formats such as a coordinate format, a compressed sparse column format, a compressed sparse row format, etc. Dataset 1124 further may be stored using various structures as known to those skilled in the art including a file system, a relational database, a system of tables, a structured query language database, etc. on SVDD training device 100, on outlier identification device 1100, and/or on distributed computing system 1128. Outlier identification device 1100 and/or distributed computing system 1128 may coordinate access to dataset 1124 that is distributed across a plurality of computing devices. For example, dataset 1124 may be stored in a cube distributed across a grid of computers as understood by a person of skill in the art. As another example, dataset 1124 may be stored in a multi-node Hadoop® cluster. For instance, Apache™ Hadoop® is an open-source software framework for distributed computing supported by the Apache Software Foundation. As another example, dataset 1124 may be stored in a cloud of computers and accessed using cloud computing technologies, as understood by a person of skill in the art. The SAS® LASR™

Analytic Server developed and provided by SAS Institute Inc. of Cary, N.C. may be used as an analytic platform to enable multiple users to concurrently access data stored in dataset 1124.

Figure 12:
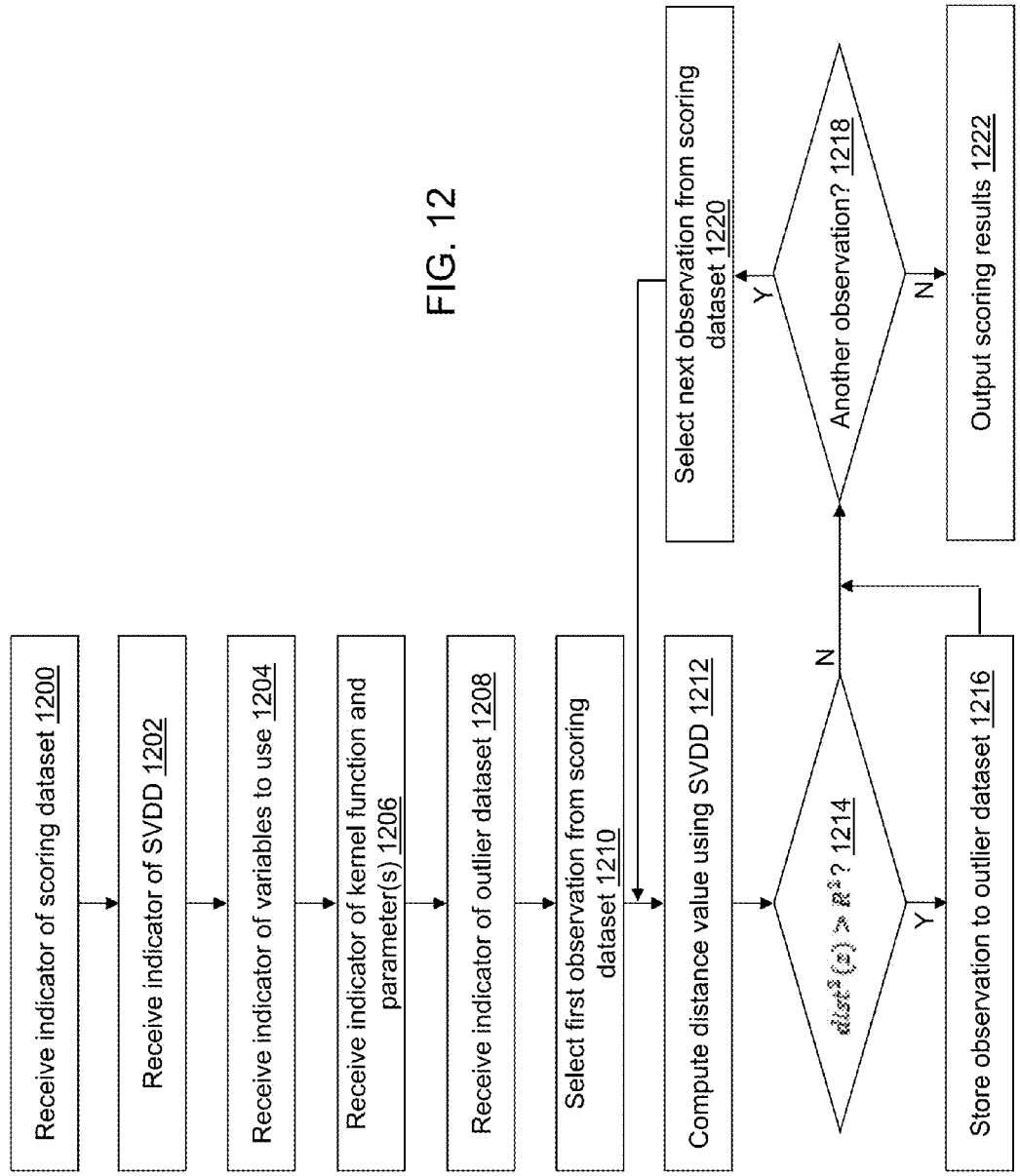
FIG. 12 depicts a flow diagram illustrating examples of operations performed by the outlier identification device of FIG. 11 in accordance with an illustrative embodiment.

Referring to FIG. 12, example operations of outlier identification application 1122 to use SVDD 126 to classify dataset 1124 and create outlier dataset 1126 are described. The operations of FIGS. 4A, 4B, 4C, and 4D may be distributed between one or more applications that are integrated or that are independent.

In an operation 1200, a fifteenth indicator is received that indicates dataset 1124. For example, the thirteenth fifteenth indicates a location and a name of dataset 1124. As an example, the fifteenth indicator may be received by outlier identification application 1122 after selection from a user interface window or after entry by a user into a user interface window. In an alternative embodiment, dataset 1124 may not be selectable. For example, a most recently created dataset may be used automatically.

In an operation 1202, a sixteenth indicator is received that indicates SVDD 126. For example, the sixteenth indicator indicates a location and a name of SVDD 126. As an example, the sixteenth indicator may be received by outlier identification application 1122 after selection from a user interface window or after entry by a user into a user interface window. In an alternative embodiment, SVDD 126 may not be selectable. For example, a default name and location for SVDD 126 may be used automatically.

In an operation 1204, a seventeenth indicator may be received that indicates a plurality of variables of dataset 1124 to define observation vector z. The same set of the plurality of variables selected in operation 402 to define SVDD 126 should be selected. The seventeenth indicator may indicate that all or only a subset of the variables stored in dataset 1124 be used to define SVDD 126. For example, the seventeenth indicator indicates a list of variables to use by name, column number, etc. In an alternative embodiment, the seventeenth indicator may not be received. For example, all of the variables may be used automatically.

Similar to operations 406 and 408, in an operation 1206, an eighteenth indicator of a kernel function and the optimal kernel parameter value to apply may be received. The same kernel function selected in operations 406 and 408 to define SVDD 126 should be selected. For example, the eighteenth indicator indicates a name of a kernel function. The eighteenth indicator may be received by outlier identification application 1122 after selection from a user interface window or after entry by a user into a user interface window. A default value for the kernel function may further be stored, for example, in second computer-readable medium 1108.

In an operation 1208, a nineteenth indicator is received that indicates outlier dataset 1126. For example, the nineteenth indicator indicates a location and a name of outlier dataset 1126. As an example, the nineteenth indicator may be received by outlier identification application 1122 after selection from a user interface window or after entry by a user into a user interface window. In an alternative embodiment, outlier dataset 1126 may not be selectable. For example, a default name and location for outlier dataset 1126 may be used automatically.

In an operation 1210, a first observation is selected as observation vector z from dataset 1124.

In an operation 1212, a distance value for observation vector z is computed using SVDD 126 as $dist^2(z)=K(z,z)-2\sum_{i=1}^{N_{SV}}\alpha_i K(x_i,z)+\sum_{i=1}^{N_{SV}}\sum_{j=1}^{N_{SV}}\alpha_i\alpha_j K(x_i,x_j)$. As discussed previously, some of the values may be constant and may have been saved with SVDD 126.

In an operation 1214, a determination is made concerning whether or not $dist^2(z)>R^2$, where $R^2$ may have been saved with SVDD 126. When $dist^2(z)>R^2$, processing continues in an operation 1216. When $dist^2(z)\leq R^2$, processing continues in an operation 1218.

In operation 1216, observation vector z and/or an indicator of observation vector z is stored to outlier dataset 1126, and processing continue in operation 1218.

In operation 1218, a determination is made concerning whether or not dataset 1124 includes another observation. When dataset 1124 includes another observation, processing continues in an operation 1220. When dataset 1124 does not include another observation, processing continues in an operation 1222.

In operation 1220, a next observation is selected as observation vector z from dataset 1124, and processing continues in operation 1212 to determine if the next observation is an outlier.

In operation 1222, scoring results are output. For example, statistical results associated with the scoring may be stored on one or more devices and/or on second computer-readable medium 1108 in a variety of formats as understood by a person of skill in the art. Outlier dataset 1126 and/or the scoring results further may be output to a second display 1116, to a second printer 1120, etc. In an illustrative embodiment, an alert message may be sent to another device using second communication interface 1106, printed on second printer 1120 or another printer, presented visually on second display 1116 or another display, presented audibly using a second speaker 1118 or another speaker when an outlier is identified.

Training application 122 incrementally learns training dataset 124 at each iteration by computing SVDD 126 on an independent random sample selected with replacement from training dataset 124. The illustrative results show that training application 122 is extremely fast and provides a nearly identical data description as compared to training using the entire dataset in a single iteration. Training application 122 can be implemented as a wrapper code around a core module for SVDD training computations either in a single machine or in a multi-machine distributed environment.

There are applications for training application 122 in areas such as process control and equipment health monitoring where the size of training dataset 124 can be very large, consisting of a few million observations. Training dataset 124 may include sensor readings measuring multiple key health or process parameters at a very high frequency. For example, a typical airplane currently has 7,000 sensors measuring critical health parameters and creates 2.5 terabytes of data per day. By 2020, this number is expected to triple or quadruple to over 7.5 terabytes. In such applications, multiple SVDD training models may be developed with each representing a different operating mode of the equipment or different process settings. A successful application of SVDD in these types of application require algorithms that can train using huge amounts of training data in an efficient manner.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
compute a first candidate optimal kernel parameter value by computing a first optimal value of a first objective function that includes a kernel function for each of a plurality of kernel parameter values from a starting kernel parameter value to an ending kernel parameter value using an incremental kernel parameter value, wherein the first objective function is defined for a support vector data description (SVDD) model using a first set of observation vectors to define a first set of support vectors, wherein a number of the first set of observation vectors is a predefined sample size, wherein the first set of support vectors define a first data description for a training dataset that includes the first set of observation vectors;
(a) increment the predefined sample size by adding a predefined sample size increment to the predefined sample size;
(b) compute a second candidate optimal kernel parameter value by computing a second optimal value of a second objective function that includes the kernel function for each of the plurality of kernel parameter values, wherein the second objective function is defined for the SVDD model using a second set of observation vectors to define a second set of support vectors, wherein a number of the second set of observation vectors is the incremented, predefined sample size, wherein the second set of support vectors define a second data description for the training dataset that includes the second set of observation vectors;
(c) compute a difference value between the computed second candidate optimal kernel parameter value and the computed first candidate optimal kernel parameter value;
repeat (a)-(c) with the computed first candidate optimal kernel parameter value as the computed second candidate optimal kernel parameter value until the computed difference value is less than or equal to a predefined convergence value; and
when the computed difference value is less than or equal to the predefined convergence value,
compute a threshold using the defined second set of support vectors that are associated with the computed second candidate optimal kernel parameter value;
output the computed second candidate optimal kernel parameter value, the defined second set of support vectors, and the computed threshold;
read an observation vector from a second dataset;
compute a distance value using the defined second set of support vectors and the read observation vector;
when the computed distance value is greater than the computed threshold, output an abnormal indicator indicating that the read observation vector is abnormal relative to the output third set of support vectors; and
when the computed distance value is not greater than the computed threshold, output a normal indicator indicating that the read observation vector is normal relative to the output third set of support vectors.

2. The non-transitory computer-readable medium of claim 1, wherein the kernel function is a Gaussian kernel function, and each of the plurality of kernel parameter values is a Gaussian bandwidth parameter.

3. The non-transitory computer-readable medium of claim 1, wherein computing the first candidate optimal kernel parameter value comprises computer-readable instructions that when executed by the computing device cause the computing device to:
for each kernel parameter value of the plurality of kernel parameter values, compute a third optimal value of the first objective function defined for the SVDD model using the kernel function, the first set of observation vectors, and a respective value for the kernel parameter to define a first plurality of sets of support vectors, where each set of support vectors of the first plurality of sets of support vectors defines a first boundary for the first set of observation vectors in association with the respective value for the kernel parameter;
for each kernel parameter value of the plurality of kernel parameter values, store the computed third optimal value in association with the respective value for the kernel parameter;
compute first difference function values between the computed third optimal values associated with successive values for the kernel parameter; and
fit a first curve to the computed first difference function values;
wherein the first candidate optimal kernel parameter value is computed as a first value for the kernel parameter where the fit first curve has a first extremum value as the kernel parameter value increases.

4. The non-transitory computer-readable medium of claim 3, wherein the first curve is fit to the computed first difference function values using a penalized B-spline curve fit function.

5. The non-transitory computer-readable medium of claim 3, wherein computing the second candidate optimal kernel parameter value comprises computer-readable instructions that when executed by the computing device cause the computing device to:
for each kernel parameter value of the plurality of kernel parameter values, compute a fourth optimal value of the second objective function defined for the SVDD model using the kernel function, the second set of observation vectors, and the respective value for the kernel parameter to define a second plurality of sets of support vectors, where each set of support vectors of the second plurality of sets of support vectors defines a second boundary for the second set of observation vectors in association with the respective value for the kernel parameter;
for each kernel parameter value of the plurality of kernel parameter values, store the computed fourth optimal value in association with the respective value for the kernel parameter;

compute second difference function values between the computed fourth optimal values associated with successive values for the kernel parameter; and fit a second curve to the computed second difference function values;

wherein the second candidate optimal kernel parameter value is computed as a second value for the kernel parameter where the fit second curve has a second extremum value as the kernel parameter value increases.

6. The non-transitory computer-readable medium of claim 5, wherein the second curve is fit to the computed second difference function values using a penalized B-spline curve fit function.

7. The non-transitory computer-readable medium of claim 1, wherein the first objective function defined for the SVDD model is $\max(\Sigma_{i=1}^{n}\alpha_i K(x_i,x_i)-\Sigma_{i=1}^{n}\Sigma_{j=1}^{n}\alpha_i\alpha_j K(x_i,x_j))$, subject to $\Sigma_{i=1}^{n}\alpha_i=1$ and $0\leq\alpha_i\leq C$, $\forall i=1,\ldots,n$, where $K(x_i,x_j)$ is the kernel function, n is the predefined sample size, $C=1/nf$ where f is an expected outlier fraction, $x_i$ and $x_j$ are the first set of observation vectors, and $\alpha_i$ and $\alpha_j$ are Lagrange constants.

8. The non-transitory computer-readable medium of claim 7, wherein the $x_i$ that have $0<\alpha_i\leq C$ are the defined first set of support vectors.

9. The non-transitory computer-readable medium of claim 7, wherein the second objective function defined for the SVDD model is $\max(\Sigma_{i=1}^{n_{inc}}\alpha_{2i}K(x_{2i},x_{2i})-\Sigma_{i=1}^{n_{inc}}\Sigma_{j=1}^{n_{inc}}\alpha_{2i}\alpha_{2j}K(x_{2i},x_{2j}))$, subject to $\Sigma_{i=1}^{n_{inc}}\alpha_{2i}=1$ and $0\leq\alpha_{2i}\leq C_{inc}$, $\forall i=1,\ldots,n_{inc}$, $n_{inc}$ is the incremented, predefined sample size, $C_{inc}=1/n_{inc}f$, $x_{2i}$ and $x_{2j}$ are the second set of observation vectors, and $\alpha_{2i}$ and $\alpha_{2j}$ are the Lagrange constants for the second objective function defined for the SVDD model.

10. The non-transitory computer-readable medium of claim 9, wherein the $x_{2i}$ that have $0<\alpha_{2i}\leq C_{inc}$ are the defined second set of support vectors.

11. The non-transitory computer-readable medium of claim 10, wherein, when the computed difference value is less than or equal to the predefined convergence value, the computer-readable instructions further cause the computing device to output the Lagrange constant $\alpha_i$ for each of the defined second set of support vectors and the defined second set of support vectors that are associated with the computed second optimal kernel parameter value.

12. The non-transitory computer-readable medium of claim 10, wherein the threshold is computed using $R^2=K(x_k,x_k)-2\Sigma_{i=1}^{N}\alpha_{2i}K(x_{2i},x_k)+\Sigma_{i=1}^{N}\Sigma_{j=1}^{N}\alpha_{2i}\alpha_{2j}K(x_{2i},x_{2j})$, where $x_k$ is any support vector of the defined second set of support vectors, and N is a number of support vectors included in the defined second set of support vectors.

13. The non-transitory computer-readable medium of claim 10, wherein the distance value is computed using $dist^2(z)=K(z,z)-2\Sigma_{i=1}^{N}\alpha_{2i}K(x_{2i},z)+\Sigma_{i=1}^{N}\Sigma_{j=1}^{N}\alpha_{2i}\alpha_{2j}K(x_{2i},x_{2j})$, where z is the read observation vector.

14. The non-transitory computer-readable medium of claim 1, wherein each observation vector of the first set of observation vectors and of the second set of observation vectors includes a plurality of values, wherein each value of the plurality of values is associated with a variable to define a plurality of variables, wherein each variable of the plurality of variables describes a characteristic of a physical object generated or captured by a device.

15. The non-transitory computer-readable medium of claim 1, wherein each observation vector of the first set of observation vectors and of the second set of observation vectors is randomly selected from the training dataset.

16. The non-transitory computer-readable medium of claim 1, wherein the predefined convergence value is computed as a function of the computed first candidate optimal kernel parameter value.

17. A computing device comprising:

a processor; and a non-transitory computer-readable medium operably coupled to the processor, the computer-readable medium having computer-readable instructions stored thereon that, when executed by the processor, cause the computing device to compute a first candidate optimal kernel parameter value by computing a first optimal value of a first objective function that includes a kernel function for each of a plurality of kernel parameter values from a starting kernel parameter value to an ending kernel parameter value using an incremental kernel parameter value, wherein the first objective function is defined for a support vector data description (SVDD) model using a first set of observation vectors to define a first set of support vectors, wherein a number of the first set of observation vectors is a predefined sample size, wherein the first set of support vectors define a first data description for a training dataset that includes the first set of observation vectors;

(a) increment the predefined sample size by adding a predefined sample size increment to the predefined sample size;

(b) compute a second candidate optimal kernel parameter value by computing a second optimal value of a second objective function that includes the kernel function for each of the plurality of kernel parameter values, wherein the second objective function is defined for the SVDD model using a second set of observation vectors to define a second set of support vectors, wherein a number of the second set of observation vectors is the incremented, predefined sample size, wherein the second set of support vectors define a second data description for the training dataset that includes the second set of observation vectors;

(c) compute a difference value between the computed second candidate optimal kernel parameter value and the computed first candidate optimal kernel parameter value;

repeat (a)-(c) with the computed first candidate optimal kernel parameter value as the computed second candidate optimal kernel parameter value until the computed difference value is less than or equal to a predefined convergence value; and when the computed difference value is less than or equal to the predefined convergence value, compute a threshold using the defined second set of support vectors that are associated with the computed second candidate optimal kernel parameter value;

output the computed second candidate optimal kernel parameter value, the defined second set of support vectors, and the computed threshold;

read an observation vector from a second dataset;

compute a distance value using the defined second set of support vectors and the read observation vector;

when the computed distance value is greater than the computed threshold, output an abnormal indicator indicating that the read observation vector is abnormal relative to the output third set of support vectors; and when the computed distance value is not greater than the computed threshold, output a normal indicator indicating that the read observation vector is normal relative to the output third set of support vectors.

18. The computing device of claim 17, wherein computing the first candidate optimal kernel parameter value comprises computer-readable instructions that when executed by the computing device cause the computing device to:

for each kernel parameter value of the plurality of kernel parameter values, compute a third optimal value of the first objective function defined for the SVDD model using the kernel function, the first set of observation vectors, and a respective value for the kernel parameter to define a first plurality of sets of support vectors, where each set of support vectors of the first plurality of sets of support vectors defines a first boundary for the first set of observation vectors in association with the respective value for the kernel parameter;

for each kernel parameter value of the plurality of kernel parameter values, store the computed third optimal value in association with the respective value for the kernel parameter;

compute first difference function values between the computed third optimal values associated with successive values for the kernel parameter; and fit a first curve to the computed first difference function values;

wherein the first candidate optimal kernel parameter value is computed as a first value for the kernel parameter where the fit first curve has a first extremum value as the kernel parameter value increases.

19. The computing device of claim 18, wherein the first curve is fit to the computed first difference function values using a penalized B-spline curve fit function.

20. The computing device of claim 18, wherein computing the second candidate optimal kernel parameter value comprises computer-readable instructions that when executed by the computing device cause the computing device to:

for each kernel parameter value of the plurality of kernel parameter values, compute a fourth optimal value of the second objective function defined for the SVDD model using the kernel function, the second set of observation vectors, and the respective value for the kernel parameter to define a second plurality of sets of support vectors, where each set of support vectors of the second plurality of sets of support vectors defines a second boundary for the second set of observation vectors in association with the respective value for the kernel parameter;

for each kernel parameter value of the plurality of kernel parameter values, store the computed fourth optimal value in association with the respective value for the kernel parameter;

compute second difference function values between the computed fourth optimal values associated with successive values for the kernel parameter; and fit a second curve to the computed second difference function values;

wherein the second candidate optimal kernel parameter value is computed as a second value for the kernel parameter where the fit second curve has a second extremum value as the kernel parameter value increases.

21. The computing device of claim 17, wherein each observation vector of the first set of observation vectors and of the second set of observation vectors is randomly selected from the training dataset.

22. A method of determining a kernel parameter value for a support vector data description for outlier identification, the method comprising:

computing, by a computing device, a first candidate optimal kernel parameter value by computing a first optimal value of a first objective function that includes a kernel function for each of a plurality of kernel parameter values from a starting kernel parameter value to an ending kernel parameter value using an incremental kernel parameter value, wherein the first objective function is defined for a support vector data description (SVDD) model using a first set of observation vectors to define a first set of support vectors, wherein a number of the first set of observation vectors is a predefined sample size, wherein the first set of support vectors define a first data description for a training dataset that includes the first set of observation vectors;

(a) incrementing, by the computing device, the predefined sample size by adding a predefined sample size increment to the predefined sample size;

(b) computing, by the computing device, a second candidate optimal kernel parameter value by computing a second optimal value of a second objective function that includes the kernel function for each of the plurality of kernel parameter values, wherein the second objective function is defined for the SVDD model using a second set of observation vectors to define a second set of support vectors, wherein a number of the second set of observation vectors is the incremented, predefined sample size, wherein the second set of support vectors define a second data description for the training dataset that includes the second set of observation vectors;

(c) computing, by the computing device, a difference value between the computed second candidate optimal kernel parameter value and the computed first candidate optimal kernel parameter value;

repeating, by the computing device, (a)-(c) with the computed first candidate optimal kernel parameter value as the computed second candidate optimal kernel parameter value until the computed difference value is less than or equal to a predefined convergence value; and when the computed difference value is less than or equal to the predefined convergence value, computing, by the computing device, a threshold using the defined second set of support vectors that are associated with the computed second candidate optimal kernel Parameter value;

outputting, by the computing device, the computed second candidate optimal kernel parameter value, the defined second set of support vectors, and the computed threshold;

reading, by the computing device, an observation vector from a second dataset;

computing, by the computing device, a distance value using the defined second set of support vectors and the read observation vector;

when the computed distance value is greater than the computed threshold, outputting, by the computing device, an abnormal indicator indicating that the read observation vector is abnormal relative to the output third set of support vectors; and when the computed distance value is not greater than the computed threshold, outputting, by the computing device, a normal indicator indicating that the read observation vector is normal relative to the output third set of support vectors.

23. The method of claim 22, wherein computing the first candidate optimal kernel parameter value comprises:

for each kernel parameter value of the plurality of kernel parameter values, computing, by the computing device, a third optimal value of the first objective function defined for the SVDD model using the kernel function, the first set of observation vectors, and a respective value for the kernel parameter to define a first plurality of sets of support vectors, where each set of support vectors of the first plurality of sets of support vectors defines a first boundary for the first set of observation vectors in association with the respective value for the kernel parameter;

for each kernel parameter value of the plurality of kernel parameter values, storing, by the computing device, the computed third optimal value in association with the respective value for the kernel parameter;

computing, by the computing device, first difference function values between the computed third optimal values associated with successive values for the kernel parameter; and fitting, by the computing device, a first curve to the computed first difference function values;

wherein the first candidate optimal kernel parameter value is computed as a first value for the kernel parameter where the fit first curve has a first extremum value as the kernel parameter value increases.

24. The method of claim 23, wherein the first curve is fit to the computed first difference function values using a penalized B-spline curve fit function.

25. The method of claim 23, wherein computing the second candidate optimal kernel parameter value comprises:

for each kernel parameter value of the plurality of kernel parameter values, computing, by the computing device, a fourth optimal value of the second objective function defined for the SVDD model using the kernel function, the second set of observation vectors, and the respective value for the kernel parameter to define a second plurality of sets of support vectors, where each set of support vectors of the second plurality of sets of support vectors defines a second boundary for the second set of observation vectors in association with the respective value for the kernel parameter;

for each kernel parameter value of the plurality of kernel parameter values, storing, by the computing device, the computed fourth optimal value in association with the respective value for the kernel parameter;

computing, by the computing device, second difference function values between the computed fourth optimal values associated with successive values for the kernel parameter; and fitting, by the computing device, a second curve to the computed second difference function values;

wherein the second candidate optimal kernel parameter value is computed as a second value for the kernel parameter where the fit second curve has a second extremum value as the kernel parameter value increases.

26. The method of claim 22, wherein each observation vector of the first set of observation vectors and of the second set of observation vectors is randomly selected from the training dataset.

27. The method of claim 22, wherein the first objective function defined for the SVDD model is $\max(\Sigma_{i=1}^{n}\alpha_i K(x_i, x_i) - \Sigma_{i=1}^{n}\Sigma_{j=1}^{n}\alpha_i\alpha_j K(x_i, x_j))$, subject to $\Sigma_{i=1}^{n}\alpha_i=1$ and $0 \leq \alpha_i \leq C$, $\forall i=1, \ldots, n$, where $K(x_i, x_j)$ is the kernel function, n is the predefined sample size, $C=1/nf$ where f is an expected outlier fraction, $x_i$ and $x_j$ are the first set of observation vectors, and $\alpha_i$ and $\alpha_j$ are Lagrange constants.

28. The method of claim 27, wherein the second objective function defined for the SVDD model is $\max(\Sigma_{i=1}^{n_{inc}}\alpha_i K(x_{2i}, x_{2i}) - \Sigma_{i=1}^{n_{inc}}\Sigma_{j=1}^{n_{inc}}\alpha_{2i}\alpha_{2j} K(x_{2i}, x_{2j}))$, subject to $\Sigma_{i=1}^{n_{inc}}\alpha_{2i}=1$ and $0 \leq \alpha_{2i} \leq C_{inc}$, $\forall i=1, \ldots, n_{inc}$, $n_{inc}$ is the incremented, predefined sample size, $C_{inc}=1/n_{inc}f$, $x_{2i}$ and $x_{2j}$ are the second set of observation vectors, and $\alpha_{2i}$ and $\alpha_{2j}$ are the Lagrange constants for the second objective function defined for the SVDD model.

29. The method of claim 28, wherein the threshold is computed using $R^2 = K(x_k, x_k) - 2\Sigma_{i=1}^{N}\alpha_{2i} K(x_{2i}, x_k) + \Sigma_{i=1}^{N}\Sigma_{j=1}^{N}\alpha_{2i}\alpha_{2j} K(x_{2i}, x_{2j})$, where $x_k$ is any support vector of the defined second set of support vectors, and N is a number of support vectors included in the defined second set of support vectors.

30. The method of claim 29, wherein the distance value is computed using $dist^2(z) = K(z,z) - 2\Sigma_{i=1}^{N}\alpha_{2i} K(x_{2i}, z) + \Sigma_{i=1}^{N}\Sigma_{1=1}\alpha_{2i}\alpha_{2j} K(x_{2i}, x_{2j})$, where z is the read observation vector.

* * * * *

UNITED STATES PATENT AND TRADEMARK OFFICE
CERTIFICATE OF CORRECTION

PATENT NO. : 9,990,592 B2
APPLICATION NO. : 15/583067
DATED : June 5, 2018
INVENTOR(S) : Sergiy Peredriy et al.

It is certified that error appears in the above-identified patent and that said Letters Patent is hereby corrected as shown below:

In the Specification

Column 7, Line 32:
Delete the phrase "$\sum_{i=1}^{n} ai = 1$" and replace with -- $\sum_{i=1}^{n} \alpha_i = 1,$ --.

Column 15, Line 41:
Delete the phrase "$a_{i-1} = \sum_{i=1}^{N_{SV1}} \alpha_i x_i$" and replace with -- $a_{j-1} = \sum_{i=1}^{N_{SV1}} \alpha_i x_i$ --.

Column 15, Line 53:
Delete the phrase "whether or not $c_{pa} \leq \in \in_a$. $c_{pa} \leq \in_a$ is a third stop condition" and replace with -- whether or not $c_{pa} \leq \in_a$. $c_{pa} \leq \in_a$ is a third stop condition --.

In the Claims

Column 25, Line 47-48:
In Claim 12, Delete the phrase "$R^2 = K(x_k, x_k) - 2\sum_{i=1,}^{N} \alpha_{2i} K(x_{2i}, x_k) + \sum_{i=1,}^{N} \sum_{j=1}^{N} \alpha_{2i} \alpha_{2j} K(x_{2i}, x_{2j}),$" and replace with -- $R^2 = K(x_k, x_k) - 2\sum_{i=1}^{N} \alpha_{2i} K(x_{2i}, x_k) + \sum_{i=1}^{N} \sum_{j=1}^{N} \alpha_{2i} \alpha_{2j} K(x_{2i}, x_{2j}),$ --.

Signed and Sealed this
Fourth Day of December, 2018

Andrei Iancu
*Director of the United States Patent and Trademark Office*